(12) United States Patent
Yang et al.

(10) Patent No.: US 12,349,152 B2
(45) Date of Patent: Jul. 1, 2025

(54) SIDELINK FEEDBACK INFORMATION TRANSMISSION METHOD AND COMMUNICATIONS APPARATUS

(71) Applicant: Huawei Technologies Co., Ltd., Shenzhen (CN)

(72) Inventors: Fan Yang, Beijing (CN); Xingwei Zhang, Lund (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 700 days.

(21) Appl. No.: 17/672,506

(22) Filed: Feb. 15, 2022

(65) Prior Publication Data

US 2022/0174720 A1 Jun. 2, 2022

Related U.S. Application Data

(63) Continuation of application No. PCT/CN2020/105841, filed on Jul. 30, 2020.

(30) Foreign Application Priority Data

Aug. 16, 2019 (CN) .......................... 201910760454.1

(51) Int. Cl.
*H04W 72/12* (2023.01)
*H04L 1/18* (2023.01)
(Continued)

(52) U.S. Cl.
CPC ........... *H04W 72/23* (2023.01); *H04L 1/1812* (2013.01)

(58) Field of Classification Search
CPC ....... H04W 72/23; H04W 4/40; H04W 72/20; H04W 92/18; H04L 1/1812; H04L 1/1822;
(Continued)

(56) References Cited

U.S. PATENT DOCUMENTS 10,716,154 B2 7/2020 Feng
11,330,561 B2 5/2022 Zhao et al.
(Continued)

FOREIGN PATENT DOCUMENTS

CN 108370565 A 8/2018
CN 108631968 A 10/2018
(Continued)

OTHER PUBLICATIONS

"3rd Generation Partnership Project; Technical Specification Group Radio Access Network; NR; Physical channels and modulation (Release 15)," 3GPP TS 38.211 V15.6.0, Jun. 2019, 97 pages.
(Continued)

*Primary Examiner* — Hoang-Chuong Q Vu
(74) *Attorney, Agent, or Firm* — Slater Matsil, LLP

(57) ABSTRACT

This application provides a sidelink feedback information transmission method and a communications apparatus, and may be used in a system such as an internet of vehicles, V2X, or V2V. The method includes: sending sidelink scheduling information to a first terminal device on a first channel, where the sidelink scheduling information is used to schedule the first terminal device to send sidelink data to a second terminal device on a sidelink; and determining a second channel, where the second channel is used to receive, from the first terminal device, HARQ information for the sidelink data.

29 Claims, 9 Drawing Sheets

(51) Int. Cl.
   *H04L 1/1812* (2023.01)
   *H04W 72/23* (2023.01)
(58) Field of Classification Search
   CPC ... H04L 1/1854; H04L 1/1893; H04L 5/0055; H04L 5/0053; H04L 1/1607; H04L 1/1848
   See application file for complete search history.

(56) References Cited

U.S. PATENT DOCUMENTS

| | | | |
|---|---|---|---|
| 2015/0189642 A1 | 7/2015 | Yang et al. | |
| 2017/0215183 A1 | 7/2017 | Gulati et al. | |
| 2019/0103947 A1 | 4/2019 | Park | |
| 2020/0092692 A1 | 3/2020 | Wang et al. | |
| 2020/0205150 A1* | 6/2020 | Cheng | H04W 72/21 |
| 2022/0109527 A1* | 4/2022 | Hwang | H04L 5/0055 |
| 2022/0159649 A1* | 5/2022 | Ko | H04L 5/0055 |
| 2023/0232422 A1* | 7/2023 | Lee | H04L 1/1893 370/329 |

FOREIGN PATENT DOCUMENTS

| | | |
|---|---|---|
| CN | 108923894 A | 11/2018 |
| CN | 109792369 A | 5/2019 |
| CN | 109792594 A | 5/2019 |
| CN | 111525987 A | 8/2020 |
| EP | 3478005 A1 | 5/2019 |
| IN | 110740016 A | 1/2020 |

OTHER PUBLICATIONS

"3rd Generation Partnership Project; Technical Specification Group Radio Access Network; NR; Multiplexing and channel coding (Release 15)," 3GPP TS 38.212 V15.6.0, Jun. 2019, 101 pages.

"3rd Generation Partnership Project; Technical Specification Group Radio Access Network; NR; Physical layer procedures for control (Release 15)," 3GPP TS 38.213 V15.6.0, Jun. 2019, 107 pages.

"3rd Generation Partnership Project; Technical Specification Group Radio Access Network; NR; Physical layer procedures for data (Release 15)," 3GPP TS 38.214 V15.6.0, Jun. 2019, 105 pages.

"3rd Generation Partnership Project; Technical Specification Group Radio Access Network; NR; Radio Resource Control (RRC) protocol specification (Release 15),"3GPP TS 38.331 V15.6.0, Jun. 2019, 519 pages.

"Discussion on Physical Layer Procedures for NR Sidelink," Agenda Item: 7.2.4.5, Source: Lenovo, Motorola Mobility, Document for: Discussion, 3GPP TSG RAN WG1 #96bis, R1-19044579, Xi'an, China, Apr. 8-12, 2019, 7 pages.

"Discussion on Resource Allocation for NR Sidelink Mode 1," Agenda Item: 7.2.4.2.1, Source: Lenovo, Motorola Mobility, Document for: Discussion, 3GPP TSG RAN WG1 #97, R1-1906268, Reno, USA, May 13-17, 2019, 4 pages.

CATT, "On Mode 1 resource allocation in NR V2X", 3GPP TSG RAN WG1 Meeting #97, R1-1906315, Reno, NV, US, May 13-17, 2019, 6 pages.

Vivo, "Enhancements of Uu link to control sidelink", 3GPP TSG RAN WG1 #96 R1-1901688, Athens, Greece, Feb. 25-Mar. 1, 2019, 10 pages.

Qualcomm Inc., "Summary#5 of CRs on UCI multiplexing on PUSCH", 3GPP TSG RAN WG1 #97, R1- 1907944, Reno, Nv, US, May 13-17, 2019, 8 pages.

Intel Corporation, "On multi-TRP/multi-panel transmission", 3GPP TSG RAN WG1 #97 R1-1907559, Reno, NV, US, May 13-17, 2019, 23 pages.

3GPP TSG RAN WG1 Meeting #97, R1-1906008, Reno, USA, May 13-17, 2019, 7.2.4.5, Huawei, HiSilicon, "Sidelink physical layer procedures for NR V2X", Discussion and Decision, total 23 pages.

* cited by examiner

SIDELINK FEEDBACK INFORMATION TRANSMISSION METHOD AND COMMUNICATIONS APPARATUS

CROSS-REFERENCE TO RELATED APPLICATIONS

This application is a continuation of International Application No. PCT/CN2020/105841, filed on Jul. 30, 2020, which claims priority to Chinese Patent Application No. 201910760454.1, filed on Aug. 16, 2019. The disclosures of the aforementioned applications are hereby incorporated by reference in their entireties.

TECHNICAL FIELD

This application relates to the communications field, and more specifically, to a sidelink feedback information transmission method and a communications apparatus.

BACKGROUND

Vehicle-to-everything (vehicle to everything, V2X) communication is an important key technology for implementing environment perception and information exchange in an internet of vehicles. A communications link between different user terminal devices may be referred to as a sidelink (SL). Communication between a vehicle and another entity, namely, vehicle-to-everything (V2X) communication may be performed on a sidelink. Physical resource allocation in the V2X communication includes two allocation modes. A first allocation mode is based on scheduling performed by a network device (for example, a base station), and user equipment in the V2X communication sends a control message and data for the V2X communication on a scheduled time-frequency resource based on scheduling information of the network device. In a second communication mode, user equipment in the V2X communication selects a time-frequency resource used for the V2X communication from available time-frequency resources included in a preconfigured V2X communication resource pool. On a sidelink, if a terminal device that receives sidelink data (referred to as a receiving device for short) fails to receive the sidelink data, the receiving device sends hybrid automatic repeat request (HARQ) information to a terminal device that sends the sidelink data (referred to as a sending device for short). The HARQ may include a negative acknowledgement (NACK). After receiving the NACK, the sending device retransmits the sidelink data. However, if the sending device works in the first resource allocation mode, a retransmission resource also needs to be scheduled by the network device, and the sending device may feed back sidelink hybrid automatic repeat request (SL HARQ) information to the network device.

However, a time at which the network device expects to receive the SL HARQ information sent by the sending device and a time at which the sending device needs to send the SL HARQ information to the network device need to be specified. Whether a scheduling time of the network device satisfies a processing requirement of the terminal device also needs to be considered. Otherwise, it is difficult to effectively implement a data retransmission mechanism on the current sidelink, reliability of data transmission on the sidelink is seriously affected, and communication efficiency is affected.

SUMMARY

This application provides a sidelink feedback information transmission method and a communications apparatus. A timing in a process of reporting sidelink HARQ information to a receiving device is designed, so that a terminal device on a sidelink reports the HARQ information on time. On the one hand, the terminal device has sufficient time to prepare, process, and report the HARQ information. On the other hand, the receiving device can receive the HARQ information on time. In this way, the receiving device can learn of a receiving time of the HARQ information, and can further learn of specific scheduling and a specific HARQ process that correspond to the HARQ information. Therefore, it is ensured that a data retransmission mechanism on the sidelink can be effectively implemented, reliability of data transmission on the sidelink is ensured, and communication efficiency is improved.

According to a first aspect, a sidelink feedback information transmission method is provided. The method may be performed by a third terminal device or a network device, or may be performed by a chip used in a third terminal device or a network device. The method includes: sending sidelink scheduling information to a first terminal device on a first channel, where the sidelink scheduling information is used to schedule the first terminal device to send sidelink data to a second terminal device on a sidelink, and the sidelink is a communications link between the first terminal device and the second terminal device; and determining a second channel, where the second channel is used to receive, from the first terminal device, hybrid automatic repeat request HARQ information for the sidelink data.

According to the sidelink feedback information transmission method provided in the first aspect, after sending the sidelink scheduling information to the first terminal device on the first channel, the network device or the third terminal device determines a position of the second channel, so that the network device or the third terminal device can determine that the HARQ information for the sidelink data scheduled on the first channel is received on the second channel. In this way, the network device or the third terminal device receives the HARQ information on time, and it is specified that the HARQ information is for a HARQ process in which scheduling is performed on the first channel. Therefore, it is ensured that a data retransmission mechanism on the sidelink can be effectively implemented, reliability of data transmission on the sidelink is ensured, and communication efficiency is improved.

In a possible implementation of the first aspect, the determining a second channel includes: determining the second channel based on the first channel and a first hybrid automatic repeat request HARQ timing, where the first HARQ timing is an offset value between the second channel and the first channel in time domain. In this implementation, when determining of a time domain position of the second channel, the time domain position of the second channel is determined based on a time domain position of the first channel and the first HARQ timing, so that efficiency of determining the time domain position of the second channel is improved, and accuracy of the time domain position of the second channel is ensured.

In a possible implementation of the first aspect, a first time domain offset value is determined based on a first subcarrier spacing and/or processing capability information of the first terminal device, and a sidelink shared channel and/or a third channel, and the first HARQ timing is greater than or equal to the first time domain offset value, where the sidelink shared channel is used to carry the sidelink data, and the third channel is used to carry the HARQ information sent by the second terminal device to the first terminal device; and the first subcarrier spacing is one of the following:

a subcarrier spacing corresponding to the first channel;
a subcarrier spacing corresponding to the second channel;
a subcarrier spacing corresponding to the sidelink shared channel; and
a smallest value among the subcarrier spacing corresponding to the first channel, the subcarrier spacing corresponding to the sidelink shared channel, and the subcarrier spacing corresponding to the second channel.

In this implementation, the first HARQ timing is greater than or equal to the first time domain offset value, and the first time domain offset value is determined based on the first subcarrier spacing and/or the processing capability information of the first terminal device, and the sidelink shared channel and/or the third channel. Therefore, it can be ensured that the first terminal device has sufficient time to prepare, process, and report the HARQ information, thereby ensuring that the data retransmission mechanism on the sidelink can be effectively implemented.

Optionally, the third channel may be a physical sidelink feedback channel between the second terminal device and the first terminal device, or the third channel may be a shared channel used by the second terminal device to send data to the first terminal device, or the third channel may be a control channel used by the second terminal device to send control signaling to the first terminal device. For example, the third channel may be a physical sidelink feedback channel.

Optionally, the first subcarrier spacing may be the subcarrier spacing corresponding to the first channel, the subcarrier spacing corresponding to the sidelink shared channel, or the subcarrier spacing corresponding to the second channel. Alternatively, the first subcarrier spacing may be a smallest subcarrier spacing among the subcarrier spacing corresponding to the first channel, the subcarrier spacing corresponding to the sidelink shared channel, and the subcarrier spacing corresponding to the second channel.

In a possible implementation of the first aspect, that a first time domain offset value is determined based on a first subcarrier spacing and/or a processing capability information of the first terminal device, and a sidelink shared channel and/or a third channel includes:

the first time domain offset value $T_0$ is determined according to the following formula:

$$T_0 = (N_L + d_{SL}) \times (2048 + 144) \times \kappa \times 2^{-\mu_1} \times T_C$$

where $N_{SL}$ is a quantity of symbols that is determined based on the first subcarrier spacing and/or the processing capability information of the first terminal device; $d_{SL}$ is a quantity of symbols that is determined based on at least one of the sidelink shared channel, the third channel, and the processing capability information of the first terminal device; $T_c$ is a first time unit; $T_s$ is a second time unit; $\kappa$ is a ratio of $T_s$ to $T_c$; and $\mu_1$ is the first subcarrier spacing.

In this implementation, the time domain position of the second channel is determined by using the foregoing formula, so that the efficiency and the accuracy of determining the time domain position of the second channel can be improved, implementation is easy, and complexity is low.

In a possible implementation of the first aspect, the determining a second channel includes: determining the second channel based on a third channel and a second hybrid automatic repeat request HARQ timing, where the second HARQ timing is an offset value between the second channel and the third channel in time domain, and the third channel is used to carry the HARQ information sent by the second terminal device to the first terminal device. In this implementation, when determining of a time domain position of the second channel, the time domain position of the second channel is determined based on a time domain position of the third channel and the second HARQ timing, so that efficiency of determining the time domain position of the second channel is improved, accuracy of the time domain position of the second channel is ensured, and a quantity of bits of a PUCCH resource indication in DCI is reduced.

In a possible implementation of the first aspect, a second time domain offset value is determined based on a second subcarrier spacing and/or processing capability information of the first terminal device, and the third channel, and the second HARQ timing is greater than or equal to the second time domain offset value, where the second subcarrier spacing is one of the following:
a subcarrier spacing corresponding to the first channel;
a subcarrier spacing corresponding to a sidelink shared channel;
a subcarrier spacing corresponding to the third channel;
a subcarrier spacing corresponding to the second channel; and
a smallest value among the subcarrier spacing corresponding to the first channel, the subcarrier spacing corresponding to the sidelink shared channel, the subcarrier spacing corresponding to the third channel, and the subcarrier spacing corresponding to the second channel, where the sidelink shared channel is used to carry the sidelink data. In this implementation, the second HARQ timing is greater than or equal to the second time domain offset value, and the second time domain offset value is determined based on the second subcarrier spacing and/or the processing capability information of the first terminal device, and the third channel. Therefore, it can be ensured that the first terminal device has sufficient time to prepare, process, and report the HARQ information, thereby ensuring that the data retransmission mechanism on the sidelink can be effectively implemented.

Optionally, the second subcarrier spacing is the subcarrier spacing corresponding to the first channel, the subcarrier spacing corresponding to the second channel, the subcarrier spacing corresponding to the third channel, or the subcarrier spacing corresponding to the sidelink shared channel. Alternatively, the second subcarrier spacing is the smallest value among the subcarrier spacing corresponding to the first channel, the subcarrier spacing corresponding to the second channel, the subcarrier spacing corresponding to the third channel, and the subcarrier spacing corresponding to the sidelink shared channel.

In a possible implementation of the first aspect, that a second time domain offset value is determined based on a second subcarrier spacing and/or processing capability information of the first terminal device, and the third channel includes:

the second time domain offset value T is determined according to the following formula:

$$T_1 = (N_{SL\text{-}to\text{-}UL} + d_{SL\text{-}to\text{-}UL}) \times (2048 + 144) \times \kappa \times 2^{-\mu_2} \times T_C$$

where $N_{SL\text{-}to\text{-}UL}$ is a quantity of symbols that is determined based on the second subcarrier spacing and/or the processing capability information of the first terminal device; $d_{SL\text{-}to\text{-}UL}$ is a quantity of symbols that is determined based on the third channel and/or the processing capability information of the first terminal device; $T_c$ is a first time unit; $T_s$ is a second time unit; $\kappa$ is a ratio of $T_s$ to $T_c$; and $\mu_2$ is the second subcarrier spacing. In this implementation, the time domain position of the second channel is determined by using the foregoing formula, so that the efficiency and the accuracy of determining the time domain position of the second channel can be improved, implementation is easy, and complexity is low.

In a possible implementation of the first aspect, when the second channel and a fourth channel overlap in time domain, a third time domain offset value is a time domain offset value between the first channel and a channel with an earlier time domain position in the second channel and the fourth channel; and the third time domain offset value is determined based on the first subcarrier spacing and/or the processing capability information of the first terminal device, and the sidelink shared channel and/or the third channel. In this implementation, when the second channel and the fourth channel overlap in time domain, the third time domain offset value between the first channel and the channel with the earlier time domain position in the second channel and the fourth channel in time domain is determined based on the first subcarrier spacing and/or the processing capability information of the first terminal device, and the sidelink shared channel and/or the third channel. When the second channel and the fourth channel are multiplexed, it can be ensured that the first terminal device has sufficient time to perform channel multiplexing processing, thereby ensuring reliability of multiplexing the second channel and the fourth channel, and ensuring normal transmission of the HARQ information.

Optionally, the fourth channel may be a PUSCH used by the first terminal device to send data to the network device, or may be a PUCCH used by the first terminal device to send control signaling to the network device. The PUCCH may be used to carry ACK or NACK information that is fed back by the first terminal device and that is used to indicate whether the first terminal device correctly receives downlink data sent by the network device. Alternatively, the fourth channel may be a PSSCH used by the first terminal device to send data to the third terminal device.

In a possible implementation of the first aspect, that the third time domain offset value is determined based on the first subcarrier spacing and/or the processing capability information of the first terminal device, and the sidelink shared channel and/or the third channel includes:

the third time domain offset value $T_2$ is determined according to the following formula:

$$T_2 = (N_{SL} + d_{SL} + x) \times (2048 + 144) \times K \times 2^{-\mu_1} \times T_C$$

where x is a positive integer. In this implementation, the third time domain offset value is determined by using the foregoing formula, so that efficiency and accuracy of determining the third time domain offset value can be improved.

Optionally, x may be a variable or a constant. There may be a correspondence between x and the subcarrier spacing. For example, when the subcarrier spacing is relatively large, a value of x is relatively large.

In a possible implementation of the first aspect, when the second channel and a fifth channel overlap in time domain, a fourth time domain offset value is a time domain offset value between the third channel and a channel with an earlier time domain position in the second channel and the fifth channel; and the fourth time domain offset value is determined based on the second subcarrier spacing and/or the processing capability information of the first terminal device, and the third channel. When the second channel and the fifth channel overlap in time domain, the fourth time domain offset value between the third channel and the channel with the earlier time domain position in the second channel and the fifth channel is determined based on the second subcarrier spacing and/or the processing capability information of the first terminal device, and the third channel. When the second channel and the fifth channel are multiplexed, it can be ensured that the first terminal device has sufficient time to perform channel multiplexing processing, thereby ensuring reliability of multiplexing the second channel and the fifth channel, and ensuring normal transmission of the HARQ information.

Optionally, the fifth channel and the fourth channel may be a same channel.

In a possible implementation of the first aspect, that the fourth time domain offset value is determined based on the second subcarrier spacing and/or the processing capability information of the first terminal device, and the third channel includes:

the fourth time domain offset value $T_3$ is determined according to the following formula:

$$T_3 = (N_{SL\text{-}to\text{-}UL} + d_{SL\text{-}to\text{-}UL} + y) \times (2048 + 144) \times K \times 2^{-\mu_2} \times T_C$$

where y is a positive integer. In this implementation, the fourth time domain offset value is determined by using the foregoing formula, so that efficiency and accuracy of determining the fourth time domain offset value can be improved.

Optionally, y may be a variable or a constant. There may be a correspondence between y and the subcarrier spacing. For example, when the subcarrier spacing is relatively large, a value of y is relatively large.

In a possible implementation of the first aspect, when the following relational expression is satisfied, $$T_4 + T_{L,PSSCH} + T_{L,CH3} + T_1 \leq T_0$$

the method further includes: receiving the HARQ information on the second channel, where $T_4$ is a time domain offset value between the first channel and the sidelink shared channel; $T_5$ is a time domain offset value between the sidelink shared channel and the third channel; $T_{L,PSSCH}$ is a time length occupied by the sidelink shared channel in time domain; and $T_{L,CH3}$ is a time length occupied by the third channel in time domain. In this implementation, it can be ensured that the first terminal device has sufficient time to prepare, process, and report the HARQ information, thereby ensuring that the data retransmission mechanism on the sidelink can be effectively implemented.

According to a second aspect, a sidelink feedback information transmission method is provided. The method may be performed by a first terminal device, or may be performed by a chip used in a first terminal device. An example in which the method is performed by the first terminal device is used. The method includes: receiving, by the first terminal device, sidelink scheduling information on a first channel, where the sidelink scheduling information is used to schedule the first terminal device to send sidelink data to a second terminal device on a sidelink, and the sidelink is a communications link between the first terminal device and the second terminal device; receiving, by the first terminal device, HARQ information that is for the sidelink data and that is sent by the second terminal device; and determining, by the first terminal device, a second channel, where the second channel is used by the first terminal device to send the HARQ information.

According to the sidelink feedback information transmission method provided in the second aspect, after receiving the sidelink scheduling information on the first channel, the first terminal device determines, by determining a position of the second channel, to send the HARQ information on the second channel for the sidelink data scheduled on the first channel. In this way, the first terminal device sends the HARQ information on time, and it is specified that the HARQ information is for a HARQ process in which scheduling is performed on the first channel. Therefore, it is ensured that a data retransmission mechanism on the sidelink can be effectively implemented, reliability of data transmission on the sidelink is ensured, and communication efficiency is improved.

In a possible implementation of the second aspect, the determining, by the first terminal device, a second channel includes: determining, by the first terminal device, the second channel based on the first channel and a first hybrid automatic repeat request HARQ timing, where the first HARQ timing is an offset value between the second channel and the first channel in time domain.

In a possible implementation of the second aspect, the first HARQ timing is greater than or equal to a first time domain offset value, and the method further includes: determining, by the first terminal device, the first time domain offset value based on a first subcarrier spacing and/or processing capability information of the first terminal device, and a sidelink shared channel and/or a third channel, where the sidelink shared channel is used to carry the sidelink data, and the third channel is used to carry the HARQ information sent by the second terminal device to the first terminal device; and
the first subcarrier spacing is one of the following:
a subcarrier spacing corresponding to the first channel;
a subcarrier spacing corresponding to the second channel;
a subcarrier spacing corresponding to the sidelink shared channel; and
a smallest value among the subcarrier spacing corresponding to the first channel, the subcarrier spacing corresponding to the sidelink shared channel, and the subcarrier spacing corresponding to the second channel.

In a possible implementation of the second aspect, the determining, by the first terminal device, the first time domain offset value based on a first subcarrier spacing and/or a processing capability information of the first terminal device, and a sidelink shared channel and/or a third channel includes:
determining the first time domain offset value $T_0$ according to the following formula:

$$T_0 = (N_{SL} + d_{SL}) \times (2048 + 144) \times \kappa \times 2^{-\mu_1} \times T_C$$

where $N_{SL}$ is a quantity of symbols that is determined based on the first subcarrier spacing and/or the processing capability information of the first terminal device; $d_{SL}$ is a quantity of symbols that is determined based on at least one of the sidelink shared channel, the third channel, and the processing capability information of the first terminal device; $T_c$ is a first time unit; $T_s$ is a second time unit; $\kappa$ is a ratio of $T_s$ to $T_c$; and $\mu_1$ is the first subcarrier spacing.

In a possible implementation of the second aspect, the determining, by the first terminal device, a second channel includes: determining, by the first terminal device, the second channel based on a third channel and a second hybrid automatic repeat request HARQ timing, where the second HARQ timing is an offset value between the second channel and the third channel in time domain, and the third channel is used to carry the HARQ information sent by the second terminal device to the first terminal device.

In a possible implementation of the second aspect, the second HARQ timing is greater than or equal to a second time domain offset value, and the method further includes: determining, by the first terminal device, the second time domain offset value based on a second subcarrier spacing and/or processing capability information of the first terminal device, and the third channel, where the second subcarrier spacing is one of the following:
a subcarrier spacing corresponding to the first channel;
a subcarrier spacing corresponding to a sidelink shared channel;
a subcarrier spacing corresponding to the second channel;
a subcarrier spacing corresponding to the third channel; and
a smallest value among the subcarrier spacing corresponding to the first channel, the subcarrier spacing corresponding to the sidelink shared channel, the subcarrier spacing corresponding to the third channel, and the subcarrier spacing corresponding to the second channel, where the sidelink shared channel is used to carry the sidelink data.

In a possible implementation of the second aspect, the determining, by the first terminal device, the second time domain offset value based on a second subcarrier spacing and/or processing capability information of the first terminal device, and the third channel includes:
determining the second time domain offset value $T_1$ according to the following formula:

$$T_1 = (N_{SL\text{-}to\text{-}UL} + d_{SL\text{-}to\text{-}UL}) \times (2048 + 144) \times \kappa \times 2^{-\mu_2} T_C$$

where $N_{SL\text{-}to\text{-}UL}$ is a quantity of symbols that is determined based on the second subcarrier spacing and/or the processing capability information of the first terminal device; $d_{SL\text{-}to\text{-}UL}$ is a quantity of symbols that is determined based on the third channel and/or the processing capability information of the first terminal device; $T_c$ is a first time unit; $T_s$ is a second time unit; $\kappa$ is a ratio of $T_s$ to $T_c$; and $\mu_2$ is the second subcarrier spacing.

In a possible implementation of the second aspect, when the second channel and a fourth channel overlap in time domain, a third time domain offset value is a time domain offset value between the first channel and a channel with an earlier time domain position in the second channel and the fourth channel; and the first terminal device determines the third time domain offset value based on the first subcarrier spacing and/or the processing capability information of the first terminal device, and the sidelink shared channel and/or the third channel.

In a possible implementation of the second aspect, that the first terminal device determines the third time domain offset value based on the first subcarrier spacing and/or the processing capability information of the first terminal device, and the sidelink shared channel and/or the third channel includes:
the third time domain offset value $T_2$ is determined according to the following formula:

$$T_2 = (N_{SL} + d_{SL} + x) \times (2048 + 144) \times \kappa \times 2^{-\mu_1} \times T_C$$

where x is a positive integer.

In a possible implementation of the second aspect, when the second channel and a fifth channel overlap in time domain, a fourth time domain offset value is a time domain offset value between the third channel and a channel with an earlier time domain position in the second channel and the fifth channel; and the first terminal device determines the fourth time domain offset value based on the second subcarrier spacing and/or the processing capability information of the first terminal device, and the third channel.

In a possible implementation of the second aspect, that the first terminal device determines the fourth time domain offset value based on the second subcarrier spacing and/or the processing capability information of the first terminal device, and the third channel includes:

the fourth time domain offset value $T_3$ is determined according to the following formula:

$$T_3 = (N_{SL\text{-}to\text{-}UL} + d_{SL\text{-}to\text{-}UL} + y) \times (2048 + 144) \times \kappa \times 2^{-\mu_2} \times T_C$$

where y is a positive integer.

In a possible implementation of the second aspect, when the following relational expression is satisfied, $$T_4 + T_{L,PSSCH} + T_5 + T_{L,CH3} + T_1 \leq T_0$$

the method further includes: sending, by the first terminal device, the HARQ information on the second channel, where $T_4$ is a time domain offset value between the first channel and the sidelink shared channel; $T_5$ is a time domain offset value between the sidelink shared channel and the third channel; $T_{L,PSSCH}$ is a time length occupied by the sidelink shared channel in time domain; and $T_{L,CH3}$ is a time length occupied by the third channel in time domain.

According to a third aspect, a communications apparatus is provided. The apparatus includes units configured to perform the steps in any one of the first aspect or the possible implementations of the first aspect.

According to a fourth aspect, a communications apparatus is provided. The apparatus includes units configured to perform the steps in any one of the second aspect or the possible implementations of the second aspect.

According to a fifth aspect, a communications apparatus is provided. The apparatus includes at least one processor and a memory, and the at least one processor is configured to perform the method in any one of the first aspect or the possible implementations of the first aspect.

According to a sixth aspect, a communications apparatus is provided. The apparatus includes at least one processor and a memory, and the at least one processor is configured to perform the method in any one of the second aspect or the possible implementations of the second aspect.

According to a seventh aspect, a communications apparatus is provided. The apparatus includes at least one processor and an interface circuit, and the at least one processor is configured to perform the method in any one of the first aspect or the possible implementations of the first aspect.

According to an eighth aspect, a communications apparatus is provided. The apparatus includes at least one processor and an interface circuit, and the at least one processor is configured to perform the method in any one of the second aspect or the possible implementations of the second aspect.

According to a ninth aspect, a network device is provided. The network device includes the communications apparatus provided in the third aspect, or the network device includes the communications apparatus provided in the fifth aspect, or the network device includes the communications apparatus provided in the seventh aspect.

According to a tenth aspect, a third terminal device is provided. The third terminal device includes the communications apparatus provided in the third aspect, or the third terminal device includes the communications apparatus provided in the fifth aspect, or the third terminal device includes the communications apparatus provided in the seventh aspect.

According to an eleventh aspect, a first terminal device is provided. The first terminal device includes the communications apparatus provided in the fourth aspect, or the first terminal device includes the communications apparatus provided in the sixth aspect, or the first terminal device includes the communications apparatus provided in the eighth aspect.

According to a twelfth aspect, a computer program product is provided. The computer program product includes a computer program, and when the computer program is executed by a processor, the computer program is configured to perform the method in any one of the first aspect or the possible implementations of the first aspect, or perform the method in any one of the second aspect or the possible implementations of the second aspect.

According to a thirteenth aspect, a computer-readable storage medium is provided. The computer-readable storage medium stores a computer program. When being executed, the computer program is configured to perform the method in any one of the first aspect or the possible implementations of the first aspect, or perform the method in any one of the second aspect or the possible implementations of the second aspect.

According to a fourteenth aspect, a communications system is provided. The communications system includes the foregoing first terminal device and at least one of the foregoing third terminal device or network device.

According to the method provided in the embodiments of this application, a timing (timing) in a process of reporting sidelink HARQ information is designed, so that a terminal device on a sidelink reports the SL HARQ information to a network device or another terminal device on time. On the one hand, the terminal device has sufficient time to prepare, process, and report the sidelink HARQ information. On the other hand, the network device or the another terminal device can receive the sidelink HARQ information on time. Therefore, it is ensured that a data retransmission mechanism on the sidelink can be effectively implemented, reliability of data transmission on the sidelink is ensured, and communication efficiency is improved.

DETAILED DESCRIPTION OF ILLUSTRATIVE EMBODIMENTS

Figure 1:
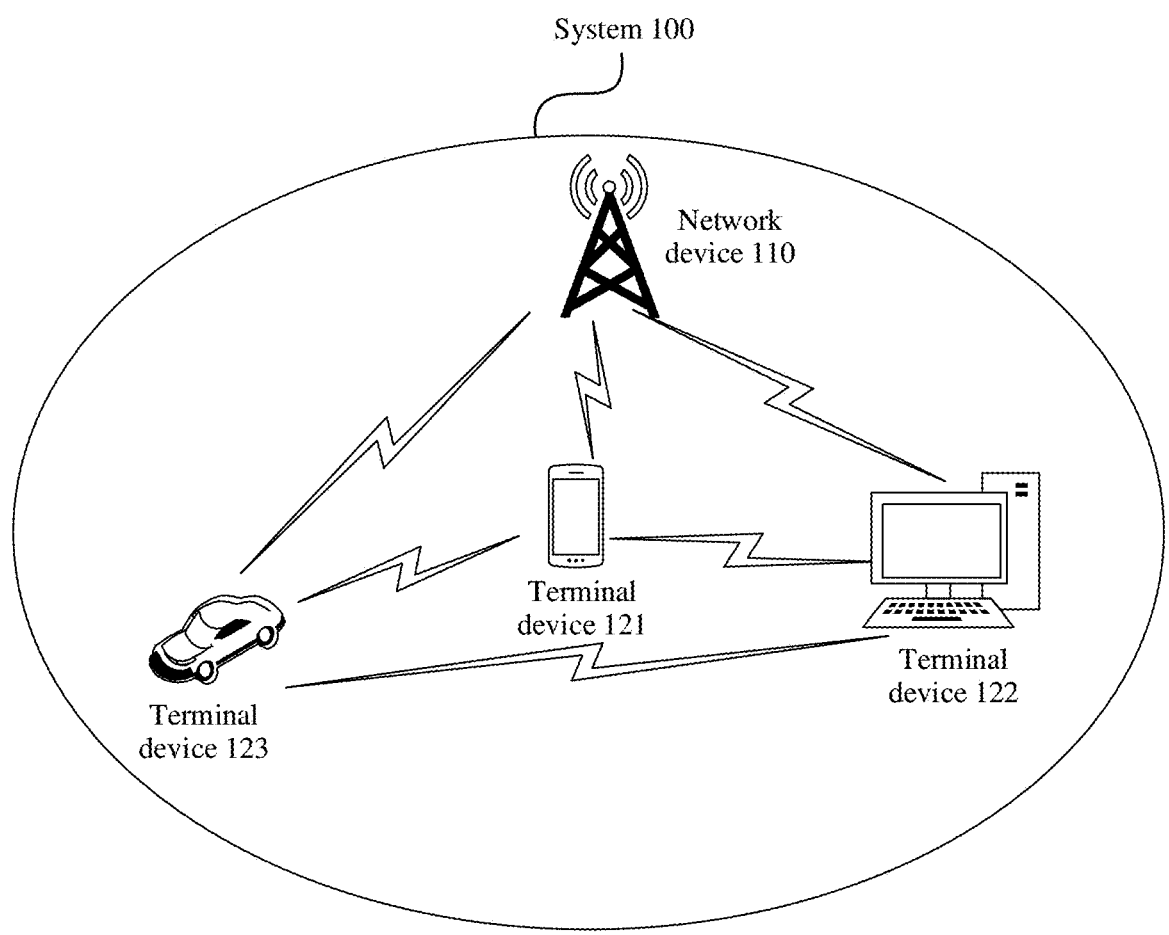
FIG. 1 is an example of a schematic architectural diagram of a mobile communications system applicable to an embodiment of this application.

The following describes technical solutions of this application with reference to the accompanying drawings.

The technical solutions in the embodiments of this application may be used in various communications systems, for example, a V2X or device-to-device (device to device, D2D) communications system, a global system for mobile communications (GSM) system, a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, and a future 5th generation (5G) system or a new radio (NR) system.

A terminal device in the embodiments of this application may be user equipment, an access terminal, a subscriber unit, a subscriber station, a mobile station, a mobile station, a remote station, a remote terminal, a mobile device, a user terminal, a terminal, a wireless communications device, a user agent, a user apparatus, or a vehicle, a vehicle-mounted device, or the like in a V2X communication system; or the terminal device may be a cellular phone, a cordless telephone set, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a future 5G network, a terminal device in a future evolved public land mobile network (PLMN), or the like. This is not limited in the embodiments of this application.

A network device in the embodiments of this application may be a device configured to communicate with a terminal device. The network device may be a base transceiver station (BTS) in a global system for mobile communications (GSM) system or a code division multiple access (CDMA) system, or may be a NodeB (NB) in a wideband code division multiple access (WCDMA) system, or may be an evolved NodeB (Evolutional NodeB, eNB or eNodeB) in an LTE system, or may be a wireless controller in a cloud radio access network (CRAN) scenario, or may be a serving transmission reception point (Serving TRP), a relay station, an access point, a vehicle-mounted device, a wearable device, a network device in a future 5G network, a network device in a future evolved PLMN, or the like. This is not limited in the embodiments of this application.

In the embodiments of this application, the terminal device or the network device includes a hardware layer, an operating system layer that is run above the hardware layer, and an application layer that is run above the operating system layer. The hardware layer includes hardware such as a central processing unit (CPU), a memory management unit (MMU), and a memory (which is also referred to as a main memory). An operating system may be any one or more types of computer operating systems, for example, a Linux operating system, a Unix operating system, an Android operating system, an iOS operating system, or a Windows operating system, that implement service processing by using a process. The application layer includes applications such as a browser, an address book, word processing software, and instant messaging software. In addition, a specific structure of an execution body of a method provided in the embodiments of this application is not specifically limited in the embodiments of this application, provided that a program that records code of the method provided in the embodiments of this application can be run to perform communication according to the method provided in the embodiments of this application. For example, the method provided in the embodiments of this application may be performed by the terminal device or the network device, or a function module that is in the terminal device or the network device and that can invoke and execute the program.

In addition, aspects or features of this application may be implemented as a product that uses standard programming and/or engineering technologies, a method, or an apparatus. The term "product" used in this application covers a computer program that can be accessed from any computer-readable component, carrier, or medium. For example, the computer-readable medium may include but is not limited to: a magnetic storage component (for example, a hard disk, a floppy disk, or a magnetic tape), an optical disc (for example, a compact disc (CD) or a digital versatile disc (DVD)), a smart card, or a flash memory component (for example, an erasable programmable read-only memory (EPROM), a card, a stick, or a key drive). In addition, various storage media described in this specification may indicate one or more devices and/or other machine-readable media that are configured to store information. The term "machine-readable media" may include but is not limited to a wireless channel, and various other media that can store, contain, and/or carry an instruction and/or data.

In a 5G system, a network device delivers downlink data to a terminal device on a physical downlink shared channel (PDSCH), and the terminal device needs to feed back corresponding HARQ information to the network device. For acknowledgement (ACK)/negative acknowledgement (NACK) information for the HARQ information, the network device needs to perform retransmission only when a NACK is fed back. When the network device schedules the terminal device to send uplink data (for example, a physical uplink shared channel (PUSCH)), the terminal device also needs to prepare and send the uplink data in time. To accurately and orderly schedule and receive all information such as the HARQ information and the uplink data, the network device sets different timings to determine when the terminal device performs feedback and reporting. However, a specific time required by the terminal device for processing is further considered, and therefore the timing (which may alternatively be referred to as a time offset) cannot be set to an excessively small value. Otherwise, the terminal device cannot perform the processing in time and cannot perform the reporting. Therefore, the timing can reflect a sequence of scheduling and a speed of specific scheduling performed by the network device, and further reflect a processing capability of the terminal device. For example, currently, a shortest time from a time at which the network device sends a PDSCH to a time at which the terminal device sends HARQ information corresponding to the PDSCH is stipulated, and it is further stipulated that when the network device schedules the terminal device to send uplink data PUSCH, a timing between a physical downlink control channel (PDCCH) carrying downlink control information (DCI) for scheduling the uplink data and the PUSCH is carried.

V2X communication is an important key technology for implementing environment perception and information exchange in an internet of vehicles. Another device herein may be another vehicle, another infrastructure, a pedestrian, a terminal device, or the like. The V2X communication may be considered as a special case of device-to-device (device to device, D2D) communication. A communications link between different user terminal devices may be referred to as an SL. For example, a communications link between vehicles may be an SL. In a V2X communications system, a physical sidelink control channel (PSCCH) is used to transmit control information in V2X communication, and a physical sidelink shared channel (PSSCH) is used to transmit data in the V2X communication.

Currently, physical resource allocation in the V2X communication includes two allocation modes, and the V2X communication includes two communication modes. A first resource allocation mode is based on scheduling performed by a network device (for example, a base station), and user equipment (for example, a vehicle or a vehicle-mounted device) in the V2X communication sends a control message and data for the V2X communication on a scheduled time-frequency resource based on scheduling information of the network device. In a second resource allocation mode, user equipment in the V2X communication selects a time-frequency resource used for the V2X communication from a preconfigured V2X communication resource pool (which may alternatively be referred to as a V2X resource set). In the first resource allocation mode, all sidelink resources are allocated by the network device. In addition, a similar HARQ feedback mechanism is further used for communication between terminal devices on a sidelink, to determine whether sidelink data (for example, a PSSCH) is successfully sent. On the sidelink, if a terminal device that receives the data (which is briefly referred to as a receiving device) does not receive the data or a cyclic redundancy check (CRC) on the data fails, the receiving device feeds back NACK information. After receiving a NACK fed back by the receiving device, a terminal device that sends the data (which is briefly referred to as a sending device) retransmits the sidelink data PSSCH. However, if the sending device works in a first communication mode, a PSSCH retransmission resource of the sending device further needs to be scheduled by the network device. How to enable the network device to learn that the sending device needs the PSSCH retransmission resource? A most direct method is that the sending device feeds back sidelink hybrid automatic repeat request (SL HARQ) information to the network device, and after receiving the SL HARQ information, the network device learns whether the sending device needs to learn of a retransmission resource.

However, currently, a time at which the network device expects to receive the SL HARQ information sent by the sending device and a time at which the sending device needs to send the SL HARQ information to the network device need to be specified. Otherwise, even if the network device receives the SL HARQ information, the network device cannot learn of specific scheduling and a specific HARQ process that correspond to the SL HARQ information, and certainly cannot determine a quantity of retransmission resources that need to be scheduled for the sending device. Consequently, it is difficult to effectively implement a data retransmission mechanism on the current sidelink, reliability of data transmission on the sidelink is seriously affected, and communication efficiency is affected.

In view of this, this application provides a sidelink feedback information transmission method. A timing in a process of reporting SL HARQ information is designed, so that a terminal device on a sidelink reports the SL HARQ information to a network device on time. On the one hand, the terminal device has sufficient time to prepare, process, and report the SL HARQ information. On the other hand, the network device can receive the SL HARQ information on time. In this way, the network device can learn of a receiving time of the SL HARQ information, and can further learn of specific scheduling and a specific HARQ process that correspond to the SL HARQ information. Therefore, it is ensured that a data retransmission mechanism on the sidelink can be effectively implemented, reliability of data transmission on the sidelink is ensured, and communication efficiency is improved.

For ease of understanding the embodiments of this application, a communications system to which the embodiments of this application are applicable is first briefly described with reference to FIG. 1 and FIG. 2.

FIG. 1 is a schematic diagram of a communications system 100 to which the communication method in the embodiments of this application is applicable. As shown in FIG. 1, the communications system 100 includes four communications devices, for example, a network device 110 and terminal devices 121 to 123. Data communication between the network device 110 and at least one of the terminal devices 121 to 123 may be performed through a wireless connection. For the terminal devices 121 to 123, a link formed between every two of the terminal devices 121 to 123 is an SL. For example, after the terminal device 121 sends sidelink data to the terminal device 122 and receives HARQ information fed back by the terminal device 122, the terminal device 121 may send sidelink feedback information to the network device 110 by using the sidelink feedback information transmission method provided in this application. For another example, after the terminal device 122 sends sidelink data to the terminal device 123 and receives HARQ information fed back by the terminal device 123, the terminal device 122 sends sidelink feedback information to the terminal device 121 by using the sidelink feedback information transmission method provided in this application. After receiving the HARQ information, the terminal device 121 may feed back the HARQ information to the network device 110.

Figure 2:
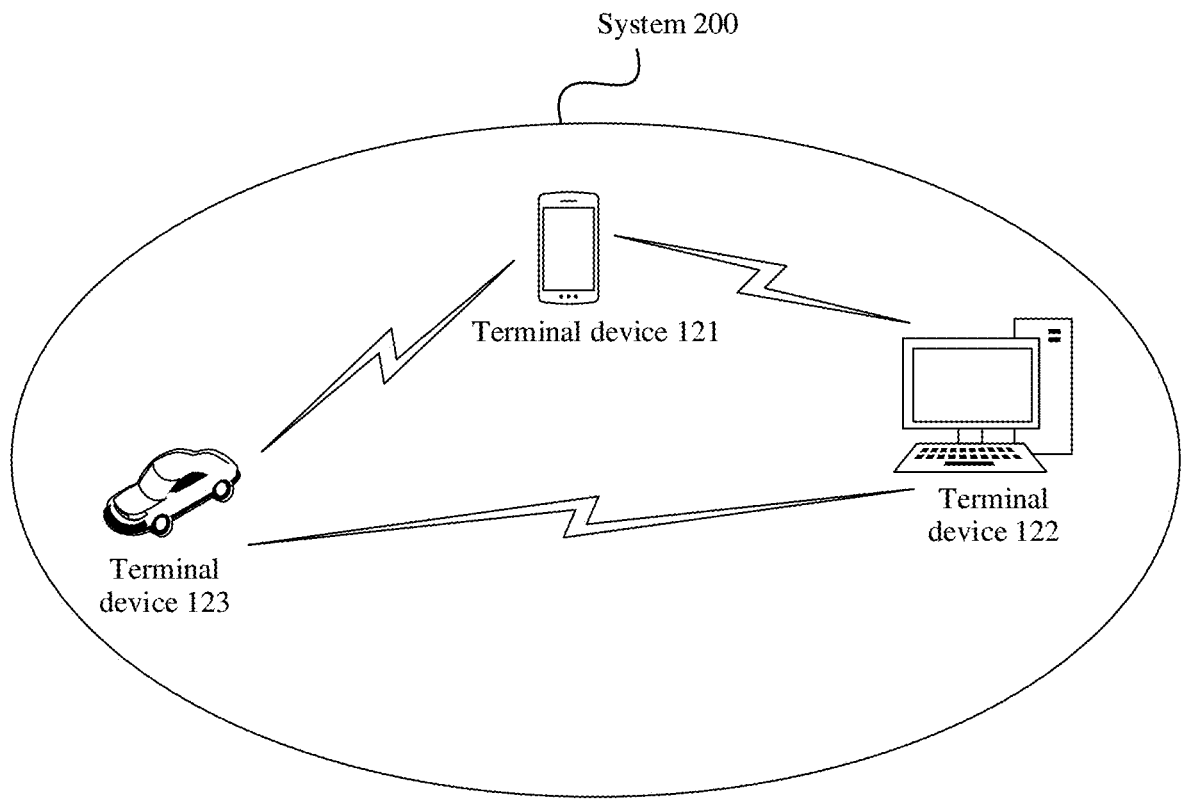
FIG. 2 is another example of a schematic architectural diagram of a mobile communications system applicable to an embodiment of this application.

FIG. 2 is a schematic diagram of another communications system 120 to which the communication method in the embodiments of this application is applicable. As shown in FIG. 2, the communications system 120 includes three communications devices, for example, terminal devices 121 to 123. The terminal devices may perform data communication in a D2D or V2X communication mode. For the terminal devices 121 to 123, a link formed between every two of the terminal devices 121 to 123 is an SL. For example, after the terminal device 122 sends sidelink data to the terminal device 123 and receives HARQ information fed back by the terminal device 123, the terminal device 122 sends sidelink feedback information to the terminal device 121 by using the sidelink feedback information transmission method provided in this application.

It should be understood that the communications systems shown in FIG. 1 and FIG. 2 may further include more network nodes, for example, terminal devices or network devices. The network device or the terminal device included in each of the communications systems shown in FIG. 1 and FIG. 2 may be the network device or the terminal device in any of the foregoing various forms. The network devices or the terminal devices in the foregoing various forms in the embodiments of this application are not shown one by one in the figure.

It should be understood that, in the embodiments of this application, an example in which the method in the embodiments is performed by a terminal device and a network device is used to describe the method in the embodiments. By way of example, and not limitation, the method may alternatively be performed by a chip used in a terminal device and a chip used in a base station. The terminal device may be a vehicle, a vehicle-mounted device, a mobile phone terminal, or the like in V2X communication.

Figure 3:
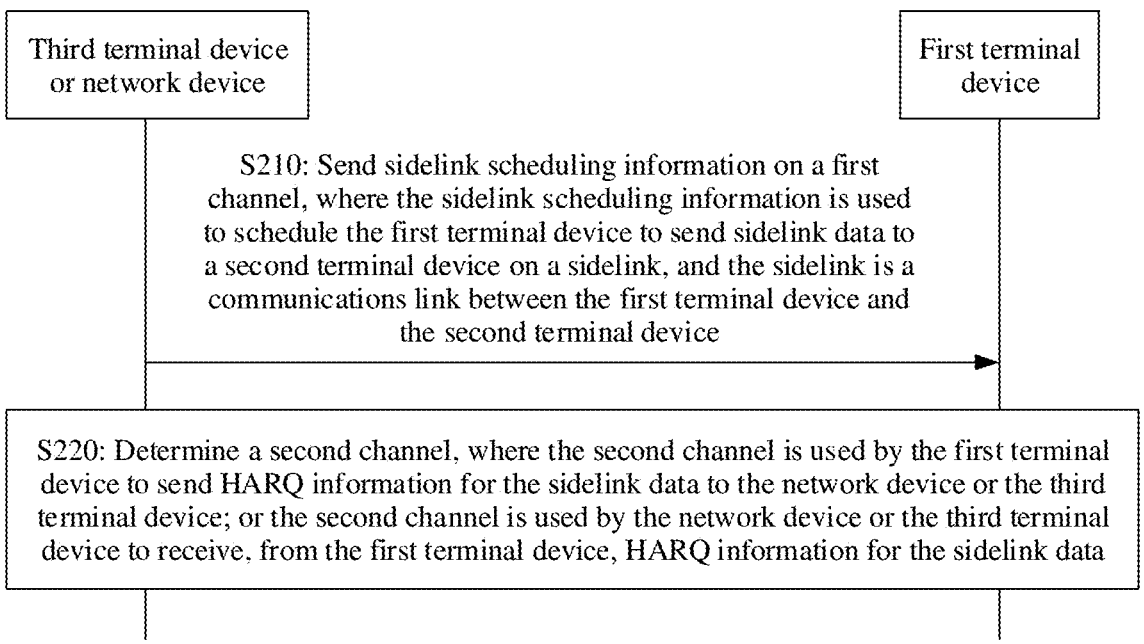
FIG. 3 is an example of a schematic interaction diagram of a sidelink feedback information transmission method according to an embodiment of this application.

As shown in FIG. 3, a method 200 shown in FIG. 3 may include step S210 to step S230. The following describes the steps in the method 200 in detail with reference to FIG. 3.

S210: A network device or a third terminal device sends sidelink scheduling information to a first terminal device on a first channel, where the sidelink scheduling information is used to schedule the first terminal device to send sidelink data to a second terminal device on a sidelink, and the sidelink is a communications link between the first terminal device and the second terminal device.

S220: The network device or the third terminal device and the first terminal device determine a second channel, where the second channel is used by the first terminal device to send HARQ information for the sidelink data to the network device or the third terminal device; or the second channel is used by the network device or the third terminal device to receive, from the first terminal device, HARQ information for the sidelink data.

In S210, when the first terminal device needs to send the sidelink data to the second terminal device, the first terminal device first determines a time-frequency resource occupied by the sidelink data. The first terminal device may send a resource request to the network device to request the time-frequency resource, or determine the time-frequency resource in a resource pool. After receiving the resource request, the network device allocates the time-frequency resource to the first terminal device, and sends, to the first terminal device on the first channel, the sidelink scheduling information in response to the resource request. The sidelink scheduling information may include configuration information of the time-frequency resource occupied by the sidelink data, and the sidelink is a communications link between the first terminal device and the second terminal device. For example, the sidelink scheduling information may include one or more of a time resource and/or a frequency resource and/or a mask that are/is used by the first terminal device to send the sidelink data to the second terminal device, a modulation scheme used to send the sidelink data, a code rate used to send the sidelink data, and power information used to send the sidelink data. The sidelink scheduling information is used to schedule the first terminal device to send the sidelink data to the second terminal device on the sidelink. Alternatively, the network device may first send the sidelink scheduling information to the third terminal device, and the third terminal device sends the sidelink scheduling information to the first terminal device on the first channel. Alternatively, the first terminal device may request the time-frequency resource from the third terminal device, and the third terminal device forwards the resource request to the network device. After determining the time-frequency resource, the network device first sends the sidelink scheduling information to the third terminal device, and the third terminal device sends the sidelink scheduling information to the first terminal device on the first channel. Alternatively, the first terminal device may request the time-frequency resource from the third terminal device, and after determining the time-frequency resource, the third terminal device sends the sidelink scheduling information to the first terminal device on the first channel. When the network device sends the sidelink scheduling information to the first terminal device on the first channel, the first channel may be a PDCCH or may be a PDSCH, and the sidelink scheduling information may be DCI. When the third terminal device sends the sidelink scheduling information to the first terminal device on the first channel, the first channel may be a PSCCH, or may be a PSSCH, and the sidelink scheduling information may be sidelink control information (sidelink control information, SCI).

In S220, after the network device or the third terminal device sends the sidelink scheduling information to the first terminal device, the first terminal device may send the sidelink data to the second terminal device on the sidelink, and the first terminal device receives, from the second terminal device, the HARQ information for the sidelink data. The HARQ information includes ACK information indicating that the second terminal device correctly receives the sidelink data, or NACK information indicating that the second terminal device incorrectly receives the sidelink data. The first terminal device needs to feed back the HARQ information to the network device or the third terminal device, to retransmit the sidelink data when the HARQ information includes a NACK, or transmit new sidelink data when the HARQ information includes an ACK. Therefore, the first terminal device needs to determine the second channel, and the second channel is used by the first terminal device to send the HARQ information to the network device or the third terminal device. The network device or the third terminal device also needs to determine the second channel, and the second channel is used by the network device or the third terminal device to receive the HARQ information from the first terminal device. The determining a second channel may be understood as determining a time-frequency position of the second channel. When the first terminal device sends the HARQ information to the network device on the second channel, the second channel may be a physical uplink control channel (PUCCH) or a physical uplink shared channel (PUSCH). When the first terminal device sends the HARQ information to the third terminal device on the second channel, the second channel may be a PSCCH between the first terminal device and the third terminal device, or a PSSCH between the first terminal device and the third terminal device, or a physical sidelink feedback channel (PSFCH) between the first terminal device and the third terminal device. After the time-frequency position of the second channel is determined, the network device or the third terminal device may correctly receive the HARQ information. Optionally, after receiving the HARQ information on the second channel, the third terminal device may forward the HARQ information to the network device.

According to the sidelink feedback information transmission method provided in this application, after sending the sidelink scheduling information to the first terminal device on the first channel, the network device or the third terminal device determines the position of the second channel, so that the network device or the third terminal device can determine that the HARQ information for the sidelink data scheduled on the first channel is received on the second channel. In this way, the network device or the third terminal device receives the HARQ information on time, and it is specified that the HARQ information is for a HARQ process in which scheduling is performed on the first channel. Therefore, it is ensured that a data retransmission mechanism on the sidelink can be effectively implemented, reliability of data transmission on the sidelink is ensured, and communication efficiency is improved.

Figure 4:
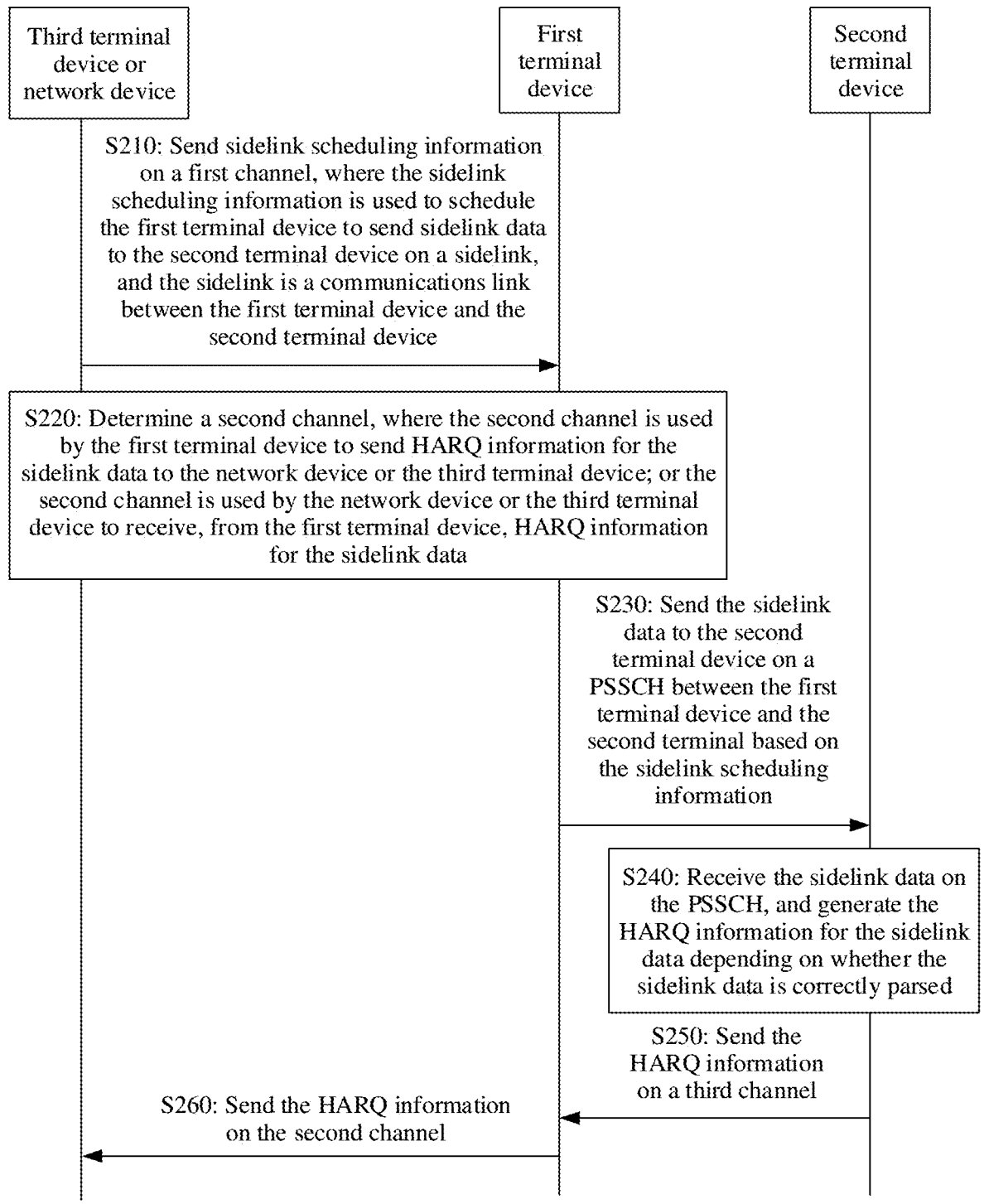
FIG. 4 is another example of a schematic interaction diagram of a sidelink feedback information transmission method according to an embodiment of this application.

In some embodiments of this application, FIG. 4 is used as an example. Based on the steps of the method shown in FIG. 3, the method 200 may further include S230, S240, S250, and S260.

S230: The first terminal device sends the sidelink data to the second terminal device on a PSSCH between the first terminal device and the second terminal based on the sidelink scheduling information. The PSSCH may be understood as the time-frequency resource occupied by the sidelink data.

S240: The second terminal device receives the sidelink data on the PSSCH, and generates the HARQ information for the sidelink data depending on whether the second terminal device correctly parses the sidelink data. The HARQ information includes the ACK information indicating that the second terminal device correctly receives the sidelink data, or the NACK information indicating that the second terminal device incorrectly receives the sidelink data.

S250: The second terminal device sends the HARQ information to the first terminal device on a third channel, where the third channel may be understood as a channel on which the second terminal device sends the HARQ information to the first terminal device.

S260: The first terminal device receives the HARQ information, and sends the HARQ information to the network device or the third terminal device on the second channel. Correspondingly, the network device or the third terminal device receives, on the second channel, the HARQ information sent by the first terminal device.

For descriptions of S210 and S220 shown in FIG. 4, refer to the foregoing descriptions of S210 and S220. For brevity, details are not described herein again.

In S230, the first terminal device may send the sidelink data to the second terminal device on the PSSCH between the first terminal device and the second terminal device based on information such as the time-frequency resource included in the sidelink scheduling information. In S240, the second terminal device receives and parses the sidelink data. If the sidelink data is successfully received (a CRC check succeeds), the ACK information is generated. If the sidelink data is incorrectly received or parsed, the NACK information is generated. The NACK information may further be used to indicate that the first terminal device needs to retransmit the sidelink data to the second terminal device. In S250, the second terminal device sends the HARQ information to the first terminal device on the third channel. For example, the third channel may be a PSFCH between the second terminal device and the first terminal device, or the third channel may be a shared channel used by the second terminal device to send data to the first terminal device, or the third channel may be a control channel used by the second terminal device to send control signaling to the first terminal device. For example, the third channel may be a physical sidelink control channel (PSCCH). The HARQ information includes the NACK information or the ACK information. In S260, the first terminal device receives the HARQ information, and sends the HARQ information to the network device or the third terminal device on the second channel. If the HARQ information includes the NACK information, the network device further needs to reallocate a retransmission resource for the sidelink data. The retransmission resource may be sent by the network device or the third terminal device to the first terminal device on the first channel by using the sidelink scheduling information in S210, so that the first terminal device obtains the retransmission resource to retransmit the sidelink data, thereby ensuring the reliability of the sidelink data transmission, and ensuring that the data retransmission mechanism on the sidelink can be effectively implemented.

Figure 5:
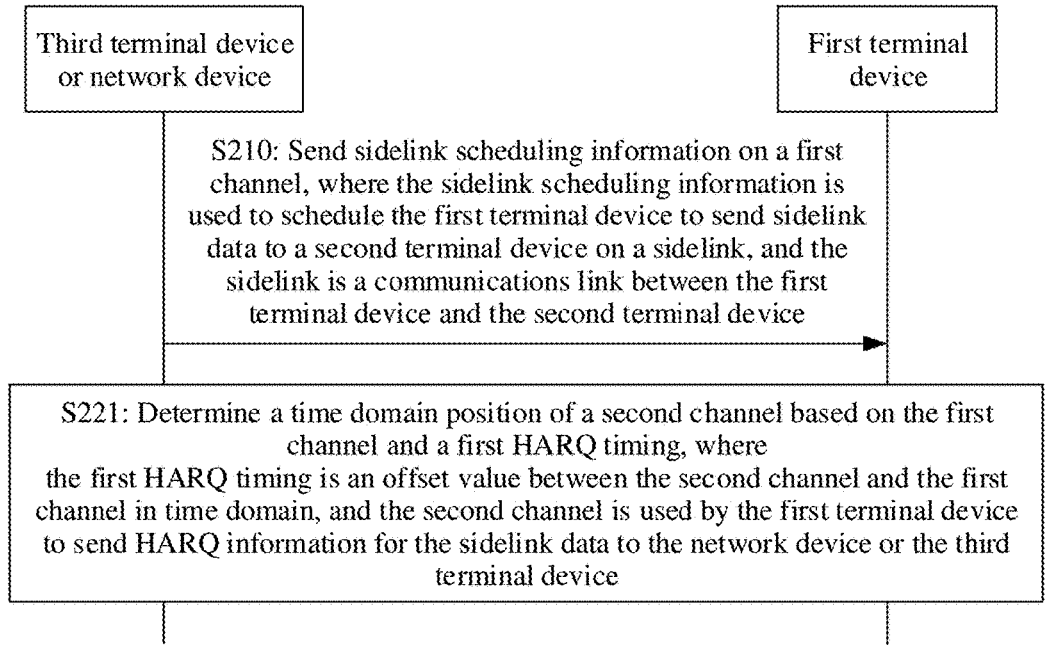
FIG. 5 is another example of a schematic interaction diagram of a sidelink feedback information transmission method according to an embodiment of this application.

In some embodiments of this application, FIG. 5 is used as an example. Based on the steps of the method shown in FIG. 3, S220 of determining, by the network device or the third terminal device and the first terminal device, a second channel in the method 200 includes S221.

S221: The network device or the third terminal device and the first terminal device determine a time domain position of the second channel based on the first channel and a first HARQ timing, where the first HARQ timing is an offset value between the second channel and the first channel in time domain.

For descriptions of S210 shown in FIG. 5, refer to the foregoing descriptions of S210. For brevity, details are not described herein again.

In S221, when determining the time domain position of the second channel, the network device or the third terminal device and the first terminal device may determine the time domain position of the second channel based on information about the first HARQ timing and a time domain position of the first channel. A value of the first HARQ timing is an offset value between the second channel and the first channel in time domain.

It should be understood that a unit of the value of the first HARQ timing may be a slot, a symbol, a subframe, or the like, or may be an absolute time unit. For example, the value of the first HARQ timing may be represented by using D microseconds (μs) or R milliseconds (ms), where both D and R are positive numbers.

Optionally, the first HARQ timing may be understood as a time domain offset value between a time unit in which an end symbol (the last symbol) of the first channel is located and a time unit in which a start symbol (the first symbol) of the second channel is located. The time unit in which the symbol is located may include a symbol, a subframe, a slot, or the like.

When determining of the time domain position of the second channel, the time domain position of the second channel is determined based on the time domain position of the first channel and the first HARQ timing, so that efficiency of determining the time domain position of the second channel is improved, and accuracy of the time domain position of the second channel is ensured.

It should be understood that the information about the first HARQ timing may be predefined in a protocol or preconfigured, or may be directly sent by the network device or the third terminal device to the first terminal device. For example, the information about the first HARQ timing may be sent to the first terminal device on the first channel. Alternatively, the network device may send the information about the first HARQ timing to the third terminal device, and the third terminal device forwards the information about the first HARQ timing to the first terminal device.

It should be further understood that the steps shown in FIG. 4 may further include S221.

Optionally, in some instances of this application, the first HARQ timing is greater than or equal to a first time domain offset value. The first time domain offset value is determined based on a first subcarrier spacing and/or processing capability information of the first terminal device, and a sidelink shared channel and/or a third channel.

The sidelink shared channel is used to carry the sidelink data, and the third channel is used to carry the HARQ information sent by the second terminal device to the first terminal device; and the first subcarrier spacing is one of the following:

a subcarrier spacing corresponding to the first channel;
a subcarrier spacing corresponding to the second channel;
a subcarrier spacing corresponding to the sidelink shared channel;
a smaller value between the subcarrier spacing corresponding to the first channel and the subcarrier spacing corresponding to the second channel; and
a smallest value among the subcarrier spacing corresponding to the first channel, the subcarrier spacing corresponding to the second channel, and the subcarrier spacing corresponding to the sidelink shared channel.

A processing procedure of the first terminal device includes: blind detection performed by the first terminal device on the sidelink scheduling information, channel estimation; encoding, modulation, scrambling, resource mapping, and sending of the sidelink data; receiving, demodulation, and decoding performed by the first terminal device on the HARQ information on the third channel; encoding and modulation of the HARQ information, and mapping of the HARQ information on the second channel; and the like. The processing capability information of the first terminal device includes a processing capability of the terminal device. For example, a higher processing capability of the first terminal device indicates a shorter time (for example, a quantity of symbols) required by the first terminal device to perform the foregoing processing procedure; or a lower processing capability of the first terminal device indicates a longer time (for example, a quantity of symbols) required by the first terminal device to perform the foregoing processing procedure.

The first subcarrier spacing K may be the subcarrier spacing corresponding to the first channel, the subcarrier spacing corresponding to the sidelink shared channel (PSSCH), or the subcarrier spacing corresponding to the second channel. Optionally, the first subcarrier spacing may alternatively be a largest subcarrier spacing among the subcarrier spacing corresponding to the first channel, the subcarrier spacing corresponding to the PSSCH, and the subcarrier spacing corresponding to the second channel. Optionally, the first subcarrier spacing may alternatively be a smallest subcarrier spacing among the subcarrier spacing corresponding to the first channel, the subcarrier spacing corresponding to the PSSCH, and the subcarrier spacing corresponding to the second channel. Alternatively, the first subcarrier spacing may be a subcarrier spacing that makes the first time domain offset value $T_0$ be the largest. The PSSCH may be understood as a size of the sidelink data or a size of a resource occupied by the sidelink data, and the third channel is used to carry the HARQ information sent by the second terminal device to the first terminal device.

The first HARQ timing is greater than or equal to the first time domain offset value $T_0$, and $T_0$ is determined based on the first subcarrier spacing and/or the processing capability information of the first terminal device, and the sidelink shared channel and/or the third channel. Therefore, it can be ensured that the first terminal device has sufficient time to prepare, process, and report the HARQ information, thereby ensuring that the data retransmission mechanism on the sidelink can be effectively implemented.

In some possible implementations of this application, when the first time domain offset value $T_0$ is determined based on the first subcarrier spacing and/or the processing capability information of the first terminal device, and the PSSCH and/or the third channel, the first time domain offset value may be determined according to the following formula (1):

$$T_0 = (N_{SL} + d_{SL}) \times (2048 + 144) \times \kappa \times 2^{-\mu_1} \times T_C \quad (1)$$

In the formula (1), $N_{SL}$ is a quantity of symbols that is determined based on the first subcarrier spacing and/or the processing capability information of the first terminal device. Specifically, a value of $N_{SL}$ increases as the subcarrier spacing increases, and a larger subcarrier spacing corresponds to a larger quantity of symbols. A stronger processing capability of the terminal indicates a smaller quantity of required symbols and a smaller value of $N_{SL}$. For example, a terminal capability 2 corresponds to a higher terminal processing capability, and a terminal device capability 1 corresponds to a lower terminal device processing capability. In this case, the terminal capability 1 corresponds to a larger value of $N_{SL}$, and the terminal device capability 2 corresponds to a smaller value of $N_{SL}$. For example, Table 1 shows an example of a table of quantities of symbols corresponding to different subcarrier spacings and terminal capability types.

TABLE 1

| Subcarrier spacing | Terminal capability 1 | Terminal capability 2 |
| --- | --- | --- |
| 15 kHz | 10 | 7 |
| 30 kHz | 15 | 10 |

It should be understood that Table 1 is merely an example, and should not constitute any limitation on this application.

$d_{SL}$ is a quantity of symbols that is determined based on one or more of the PSSCH, the third channel, and the processing capability information of the first terminal device. For example, $d_{SL}$ may be a quantity of symbols that is determined based on one or more of a quantity of time domain symbols, a resource mapping relationship, a position of a demodulation reference signal, and a quantity of demodulation reference signals of the PSSCH and/or the third channel. When the quantity of symbols of the PSSCH and/or the third channel is relatively large, a value of $d_{SL}$ is relatively small. When the quantity of symbols of the PSSCH and/or the third channel is relatively small, a value of $d_{SL}$ is relatively large. For another example, when a quantity of symbols of the demodulation reference signal (demodulation reference signal, DMRS) of the PSSCH and/or the third channel is relatively large, a value of $d_{SL}$ is relatively large. For another example, when the DMRS of the PSSCH and/or the DMRS of the third channel are/is located on the first three symbols of a time-frequency resource on which the PSSCH and/or a time-frequency resource on which the third channel are/is located, for example, when the DMRS of the PSSCH and/or the DMRS of the third channel are/is located on the first symbol, a value of $d_{SL}$ is less than a corresponding value of $d_{SL}$ when the DMRS is located on another symbol. For another example, a stronger processing capability of the terminal device indicates a smaller quantity of required symbols and a smaller value of $d_{SL}$. For another example, the terminal device capability 2 corresponds to a higher terminal processing capability, and the terminal device capability 1 corresponds to a lower terminal processing capability. In this case, the terminal capability 1 corresponds to a larger value of $d_{SL}$, and the terminal capability 2 corresponds to a smaller value of $d_{SL}$.

$T_c$ is a first time unit, $T_s$ is a second time unit, κ is a ratio of $T_s$ to $T_c$, and $\mu_1$ is the first subcarrier spacing. $T_s=1/(\Delta f_{ref} \cdot N_{fref})$, $\Delta f_{ref}=15\times10^3$ Hz, and $N_{fref}=2048$, where $T_s$ may be understood as a basic time unit in an LTE system.

$T_c=1/(\Delta f_{max} \cdot N_f)$, $\Delta f_{max}=480\times10^3$ Hz, $N_f=4096$, where $T_c$ may be understood as a basic time unit in an NR system.

It should be understood that the foregoing formula (1) is merely an example. In the embodiments of this application, $T_0$, $N_{SL}$, and $d_{SL}$ may alternatively satisfy another function relationship, for example, an exponential function relationship or a logarithmic function relationship. This is not limited in the embodiments of this application.

It should be further understood that, in the embodiments of this application, the symbol may also be referred to as a time domain symbol, and may be an orthogonal frequency division multiplexing (orthogonal frequency division multiplexing, OFDM) symbol or a single-carrier frequency division multiple access (single carrier frequency division multiple access, SC-FDMA) symbol. SC-FDMA is also referred to as orthogonal frequency division multiplexing with transform precoding (orthogonal frequency division multiplexing with transform precoding, OFDM with TP).

The time domain position of the second channel is determined by using the foregoing formula (1), so that the efficiency and the accuracy of determining the time domain position of the second channel can be improved, implementation is easy, and complexity is low.

Figure 6:
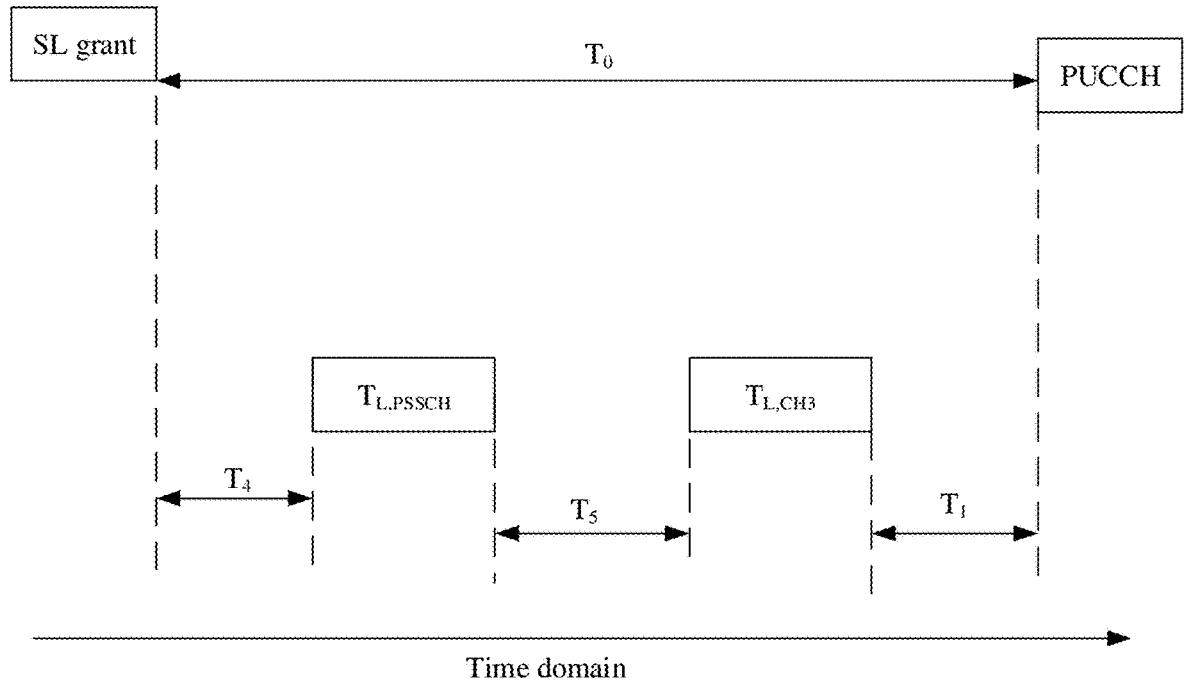
FIG. 6 is an example of a timing diagram from a time at which a network device sends sidelink scheduling information on a first channel to a time at which the network device receives HARQ information on a second channel according to an embodiment of this application.

FIG. 6 is used as an example. FIG. 6 is a timing diagram from a time at which the network device sends the sidelink scheduling information on the first channel to a time at which the network device receives the HARQ information on the second channel. In FIG. 6, the sidelink scheduling information is represented by using a sidelink grant (SL Grant), and the SL grant may further indicate the time domain position of the first channel. For example, the sidelink data is represented by using a PSSCH, and the second channel is represented by using a PUCCH. The first time domain offset value is represented by using $T_0$. In FIG. 6, $T_1$ represents an offset value (a second time domain offset value) between the second channel and the third channel in time domain. $T_4$ represents a time used by the first terminal device to prepare the sidelink data. $T_4$ is a time domain offset value between the first channel and the sidelink shared channel. $T_4$ may be understood as a time domain offset value between the time unit in which the end symbol (the last symbol) of the first channel is located and a time unit in which a start symbol (the first symbol) of the PSSCH is located. $T_{L,PSSCH}$ is a time length occupied in time domain by the sidelink shared channel carrying the sidelink data. $T_5$ is a time domain offset value between the PSSCH and the third channel. Alternatively, $T_5$ is a time used by the second terminal device to process the sidelink data and generate the HARQ information. $T_5$ may be understood as a time domain offset value between a time unit in which an end symbol (the last symbol) of the PSSCH is located and a time unit in which a start symbol (the first symbol) of the third channel is located. That the second terminal device processes the sidelink data may include: channel estimation, a CRC check, data decoding, and the like on the PSSCH. That the second terminal device generates the HARQ information may include: generation of a HARQ codebook, encoding, modulation, scrambling, and mapping of the HARQ information, and the like. $T_{L,CH3}$ is a time length occupied in time domain by the third channel carrying the HARQ information. $T_1$ is a time used by the first terminal device to prepare the HARQ information. $T_1$ may include: a time used by the first terminal device to demodulate and decode the HARQ information received from the third channel, and a time used by the first terminal device to encode and modulate the HARQ information, and map the HARQ information on the second channel. $T_1$ may further be understood as a time domain offset value between a time unit in which an end symbol (the last symbol) of the third channel is located and a time unit in which a start symbol (the first symbol) of the second channel is located. The first offset value $T_0$ may be a time length from a time at which the network device completes sending the sidelink scheduling information to a time at which the network device receives the HARQ information, or the first offset value $T_0$ may be understood as a time domain offset value between the time unit in which the end symbol (the last symbol) of the first channel is located and the time unit in which the start symbol (the first symbol) of the second channel is located.

Optionally, in the embodiments of this application, the start symbol of the second channel may not be earlier than a symbol $P_0$, and the symbol $P_0$ is a next symbol after a time of $T_0$ starting from the end symbol of the first channel. For example, if a time point after the time of $T_0$ starting from the end symbol of the first channel is an end time point of a symbol (which is assumed to be an $n^{th}$ symbol), namely, a boundary of the symbol, the next symbol after the time of $T_0$ starting from the end symbol of the first channel is an $(n+1)^{th}$ symbol, that is, the symbol $P_0$ is the $(n+1)^{th}$ symbol. That is, the start symbol of the second channel is the $(n+1)^{th}$ symbol or a symbol later than the $(n+1)^{th}$ symbol. For example, the start symbol of the second channel is an $(n+2)^{th}$ symbol or an $(n+3)^{th}$ symbol. If a time point after the time of $T_0$ starting from the end symbol of the first channel is a middle position of a symbol (which is assumed to be an $m^{th}$ symbol), to be specific, is not a boundary of the symbol, where the middle position herein may be understood as a time point falling in a range from a start time point (including the start time point) of the $m^{th}$ symbol to an end time point (excluding the end time point) of the $m^h$ symbol, the next symbol after the time of $T_0$ starting from the end symbol of the first channel is an $(m+1)^{th}$ symbol, and the symbol $P_0$ is the $(m+1)^{th}$ symbol. That is, the start symbol of the second channel is the $(m+1)^{th}$ symbol or a symbol later than the $(m+1)^{th}$ symbol. For example, the start symbol of the second channel is an $(m+2)^{th}$ symbol or an $(m+3)^{th}$ symbol.

Optionally, in some embodiments of this application, if the unit of the first HARQ timing is a slot, the value of the first HARQ timing may be n slots, where n is a positive integer.

Figure 7:
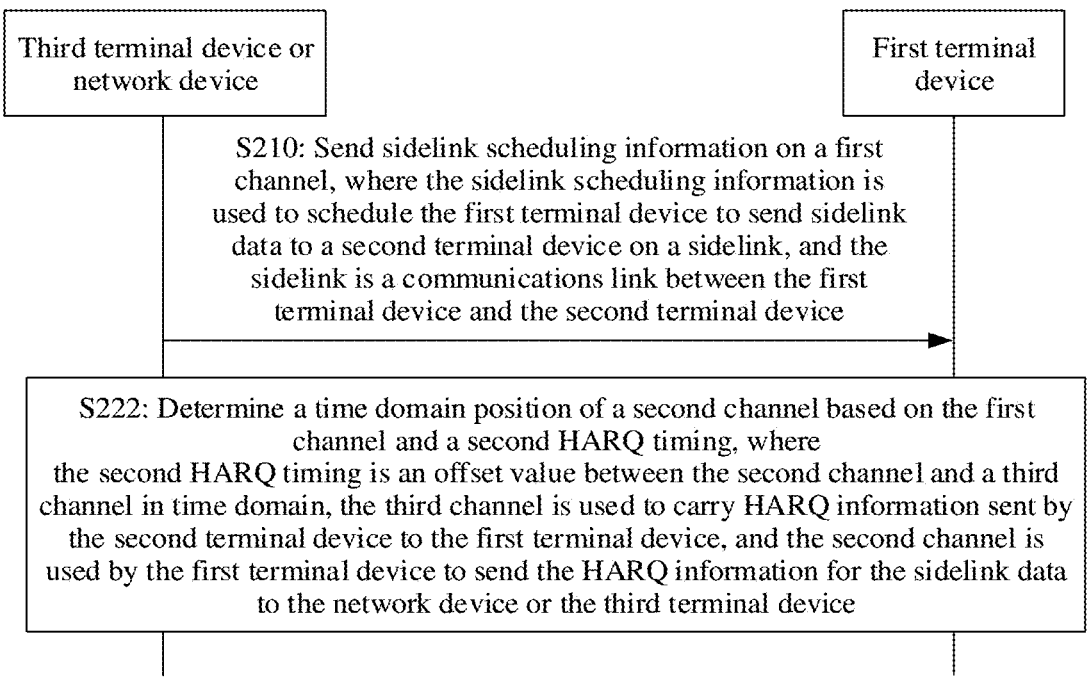
FIG. 7 is another example of a schematic interaction diagram of a sidelink feedback information transmission method according to an embodiment of this application.

In some embodiments of this application, FIG. 7 is used as an example. Based on the steps of the method shown in FIG. 3, S220 of determining, by the network device or the third terminal device and the first terminal device, a second channel in the method 200 includes S222.

S222: The network device or the third terminal device and the first terminal device determine the second channel based on a third channel and a second HARQ timing, where the second HARQ timing is an offset value between the second channel and the third channel in time domain, and the third channel is used to carry the HARQ information sent by the second terminal device to the first terminal device.

It should be understood that a unit of a value of the second HARQ timing may be a slot, a symbol, a subframe, or the like, or may be an absolute time unit. For example, the unit of the value of the second HARQ timing may be represented by using microsecond (μs) or millisecond (ms).

Optionally, the second HARQ timing may be a time domain offset value between a time unit in which an end symbol (the last symbol) of the third channel is located and a time unit in which a start symbol (the first symbol) of the second channel is located. The time unit in which the symbol is located may include a symbol, a subframe, a slot, or the like.

When determining of a time domain position of the second channel, the time domain position of the second channel is determined based on a time domain position of the third channel and the second HARQ timing, so that efficiency of determining the time domain position of the second channel is improved, and accuracy of the time domain position of the second channel is ensured.

It should be understood that the second HARQ timing may be predefined in a protocol or preconfigured. For example, the second HARQ timing may be sent to the first terminal device on the first channel. Alternatively, the network device may send the second HARQ timing to the third terminal device, and the third terminal device forwards the second HARQ timing to the first terminal device.

It should be further understood that the steps shown in FIG. 4 may further include S222.

Optionally, in some instances of this application, the second HARQ timing is greater than or equal to a second time domain offset value. The second time domain offset value is determined based on a second subcarrier spacing and/or processing capability information of the first terminal device, and the third channel.

The second subcarrier spacing is one of the following:
a subcarrier spacing corresponding to the first channel;
a subcarrier spacing corresponding to a PSSCH;
a subcarrier spacing corresponding to the second channel;
a subcarrier spacing corresponding to the third channel; and
a smallest value among the subcarrier spacing corresponding to the first channel, the subcarrier spacing corresponding to the PSSCH, the subcarrier spacing corresponding to the third channel, and the subcarrier spacing corresponding to the second channel, where the PSSCH is used to carry the sidelink data sent by the first terminal device to the second terminal device.

For descriptions of a processing capability information of the first terminal device, the third channel, and the PSSCH, refer to the foregoing related descriptions of the processing capability information of the first terminal device, the third channel, and the PSSCH. For brevity, details are not described herein again.

The second subcarrier spacing is the subcarrier spacing corresponding to the first channel, the subcarrier spacing corresponding to the second channel, the subcarrier spacing corresponding to the third channel, or the subcarrier spacing corresponding to the PSSCH. Alternatively, the second subcarrier spacing is the smallest value among the subcarrier spacing corresponding to the first channel, the subcarrier spacing corresponding to the second channel, the subcarrier spacing corresponding to the third channel, and the subcarrier spacing corresponding to the PSSCH. Alternatively, the second subcarrier spacing is a largest value among the subcarrier spacing corresponding to the first channel, the subcarrier spacing corresponding to the second channel, the subcarrier spacing corresponding to the third channel, and the subcarrier spacing corresponding to the PSSCH. Alternatively, the second subcarrier spacing may be a subcarrier spacing that makes the second time domain offset value $T_1$ be the largest.

The second HARQ timing is greater than or equal to the second time domain offset value $T_1$, and $T_1$ is determined based on the second subcarrier spacing and/or the processing capability information of the first terminal device, and the third channel. Therefore, it can be ensured that the first terminal device has sufficient time to prepare, process, and report the HARQ information, thereby ensuring that the data retransmission mechanism on the sidelink can be effectively implemented.

With reference to the example shown in FIG. 6, $T_1$ may be a time length used by the first terminal device to prepare the HARQ information. $T_1$ may include: a time used by the first terminal device to demodulate and decode the HARQ information, and a time used by the first terminal device to encode and modulate the HARQ information, map the HARQ information on the second channel, and send the HARQ information on the second channel.

In some possible implementations of this application, when the second time domain offset value $T_1$ is determined based on the second subcarrier spacing and/or the processing capability information of the first terminal device, and the third channel, the second time domain offset value may be determined according to the following formula (2):

$$T_1 = (N_{SL\text{-}to\text{-}UL} + d_{SL\text{-}to\text{-}UL}) \times (2048 + 144) \times \kappa \times 2^{-\mu_2} \times T_C \quad (2)$$

$N_{SL\text{-}to\text{-}UL}$ is a quantity of symbols that is determined based on the second subcarrier spacing and/or the processing capability information of the first terminal device. Specifically, $N_{SL\text{-}to\text{-}UL}$ increases as the subcarrier spacing increases, and a larger subcarrier corresponds to a larger quantity of symbols. A stronger processing capability of the terminal indicates a smaller quantity of required symbols and a smaller value of $N_{SL\text{-}to\text{-}UL}$. For example, a terminal capability 2 corresponds to a higher terminal processing capability, and a terminal capability 1 corresponds to a lower terminal processing capability. In this case, the terminal capability 1 corresponds to a larger value of $N_{SL\text{-}to\text{-}UL}$, and the terminal capability 2 corresponds to a smaller value of $N_{SL\text{-}to\text{-}UL}$.

$d_{SL\text{-}to\text{-}UL}$ is a quantity of symbols that is determined based on the third channel and/or the processing capability information of the first terminal device. For example, $d_{SL\text{-}to\text{-}UL}$ may be a quantity of symbols that is determined based on one or more of a quantity of time domain symbols, a resource mapping relationship, a position of a demodulation reference signal, and a quantity of demodulation reference signals of the third channel. When the quantity of symbols of the third channel is relatively large, a value of $d_{SL\text{-}to\text{-}UL}$ is relatively small. When the quantity of symbols of the third channel is relatively small, a value of $d_{SL\text{-}to\text{-}UL}$ is relatively large. For another example, when a quantity of symbols of the DMRS of the third channel is relatively large, a value of $d_{SL\text{-}to\text{-}UL}$ is relatively large. For another example, when the DMRS of the third channel is located on the first three symbols of a time-frequency resource on which the third channel is located, for example, when the DMRS of the third channel is located on the first symbol, a value of $d_{SL\text{-}to\text{-}UL}$ is less than a corresponding value of $d_{SL\text{-}to\text{-}UL}$ when the DMRS is located on another symbol. For another example, a stronger processing capability of the terminal device indicates a smaller quantity of required symbols and a smaller value of $d_{SL\text{-}to\text{-}UL}$. For another example, the terminal device capability 2 corresponds to a higher terminal processing capability, and the terminal device capability 1 corresponds to a lower terminal processing capability. In this case, the terminal capability 1 corresponds to a larger value of $d_{SL\text{-}to\text{-}UL}$, and the terminal capability 2 corresponds to a smaller value of $d_{SL\text{-}to\text{-}UL}$.

$T_c$ is a first time unit, $T_s$ is a second time unit, $\kappa$ is a ratio of $T_s$ to $T_c$, and $\mu_2$ is the second subcarrier spacing. For descriptions of $T_c$, $T_s$, and $\kappa$, refer to the foregoing descriptions of $T_c$, $T_s$, and $\kappa$. For brevity, details are not described herein again.

It should be understood that the foregoing formula (2) is merely an example. In the embodiments of this application, $T_1$, $N_{SL\text{-}to\text{-}UL}$, and $d_{SL\text{-}to\text{-}UL}$ may alternatively satisfy another function relationship, for example, an exponential function relationship or a logarithmic function relationship. This is not limited in the embodiments of this application.

Optionally, in the embodiments of this application, the start symbol of the second channel may not be earlier than a symbol $P_1$, and the symbol $P_1$ is a next symbol after a time of $T_1$ starting from the end symbol of the third channel. For example, if a time point after the time of $T_1$ starting from the end symbol of the third channel is an end time point of a symbol (which is assumed to be a $z^{th}$ symbol), namely, a boundary of the symbol, the next symbol after the time of $T_1$ starting from the end symbol of the third channel is a $(z+1)^{th}$ symbol, that is, the symbol $P_1$ is the $(z+1)^{th}$ symbol. That is, the start symbol of the second channel is the $(z+1)^{th}$ symbol or a symbol later than the $(z+1)^{th}$ symbol. For example, the start symbol of the second channel is a $(z+2)^{th}$ symbol or a $(z+3)^{th}$ symbol. If a time point after the time of $T_1$ starting from the end symbol of the third channel is a middle position of a symbol (which is assumed to be an $L^{th}$ symbol), to be specific, is not a boundary of the symbol, where the middle position herein may be understood as a time point falling in a range from a start time point (including the start time point) of the $L^{th}$ symbol to an end time point (excluding the end time point) of the $L^{th}$ symbol, the next symbol after the time of $T_1$ starting from the end symbol of the third channel is an $(L+1)^{th}$ symbol, and the symbol $P_1$ is the $(L+1)^{th}$ symbol. That is, the start symbol of the second channel is the $(L+1)^{th}$ symbol or a symbol later than the $(L+1)^{th}$ symbol. For example, the start symbol of the second channel is an $(L+2)^{th}$ symbol or an $(L+3)^{th}$ symbol.

Optionally, in some embodiments of this application, if the unit of the second HARQ timing is a slot, the value of the second HARQ timing may be m slots, where m is a positive integer.

Optionally, in some embodiments of this application, when the second channel and a fourth channel overlap in time domain, a third time domain offset value is a time domain offset value between the first channel and a channel with an earlier time domain position in the second channel and the fourth channel; and the third time domain offset value is determined based on the first subcarrier spacing and/or the processing capability information of the first terminal device, and the sidelink shared channel and/or the third channel.

Specifically, the fourth channel may be a PUSCH used by the first terminal device to send data to the network device, or may be a PUCCH used by the first terminal device to send control signaling to the network device. The PUCCH may be used to carry ACK or NACK information that is fed back by the first terminal device and that is used to indicate whether the first terminal device correctly receives downlink data sent by the network device. The PUSCH may be used to carry uplink data sent by the first terminal device to the network device.

Optionally, the fourth channel may alternatively be a PSSCH used by the first terminal device to send data to the third terminal device.

It should be understood that, that the second channel and a fourth channel overlap in time domain may be understood as that the second channel and the fourth channel have at least one same symbol (for example, an OFDM symbol) in time domain, that is, the second channel and the fourth channel share at least a part of time domain resources.

It should be further understood that the channel with the earlier time domain position in the second channel and the fourth channel may be a channel with an earlier start position in the second channel and the fourth channel. The start position of the channel may be represented by using a start symbol of the channel, so that the channel with the earlier start position may be a channel with an earlier start symbol. A position of the start symbol of the channel may be determined based on an index of a time unit in which the start symbol of the channel is located. A smaller index of the time unit in which the start symbol of the channel is located indicates an earlier start symbol of the channel. Optionally, the time unit in which the start symbol of the channel is located may be a symbol, a slot, a subframe, or the like.

The third time domain offset value is the time domain offset value between the first channel and the channel with the earlier time domain position in the second channel and the fourth channel. The third time domain offset value may be understood as a time domain offset value between a time unit in which a start symbol (the first symbol) of the first channel is located and an end symbol (the last symbol) of the channel with the earlier time domain position in the second channel and the fourth channel. The time unit in which the symbol is located may include a symbol, a subframe, a slot, or the like. The third time domain offset value is determined based on the first subcarrier spacing and/or the processing capability information of the first terminal device, and the sidelink shared channel and/or the third channel. For the processing capability information of the first terminal device, the first subcarrier spacing, the PSSCH, and the third channel, refer to the foregoing descriptions. For brevity, details are not described herein again.

In the embodiments of this application, when the second channel and the fourth channel overlap in time domain, the third time domain offset value between the first channel and the channel with the earlier time domain position in the second channel and the fourth channel in time domain is determined based on the first subcarrier spacing and/or the processing capability information of the first terminal device, and the PSSCH and/or the third channel. When the second channel and the fourth channel are multiplexed, it can be ensured that the first terminal device has sufficient time to perform channel multiplexing processing, thereby ensuring reliability of multiplexing the second channel and the fourth channel, and ensuring normal transmission of the HARQ information.

In some possible implementations of this application, when the network device or the third terminal device and the first terminal device determine the third time domain offset value based on the first subcarrier spacing and/or the processing capability information of the first terminal device, and the sidelink shared channel and/or the third channel, the third time domain offset value may be determined according to the following formula (3):

$$T_2 = (N_{SL} + d_{SL} + x) \times (2048 + 144) \times \kappa \times 2^{-\mu_1} \times T_C \qquad (3)$$

$T_2$ represents the third time domain offset value, $N_{SL}$ is a quantity of symbols that is determined based on the first subcarrier spacing and/or the processing capability information of the first terminal device, and $d_{SL}$ is a quantity of symbols that is determined based on one or more of the PSSCH, the third channel, and the processing capability information of the first terminal device. For descriptions of $N_{SL}$, $d_{SL}$, $T_c$, $T_s$, $\kappa$, $\mu_1$, and the first subcarrier spacing, refer to the foregoing related descriptions. For brevity, details are not described herein again.

x is a positive integer. x may be a variable or a constant. For example, x may be 1, 2, or 3. Alternatively, x may be determined based on the first subcarrier spacing and/or the processing capability information of the first terminal device. Alternatively, x may be determined based on the PSSCH and/or the third channel.

For example, when x is equal to 1, the foregoing formula (3) is changed to the following formula (4):

$$T_2 = (N_{SL} + d_{SL} + 1) \times (2048 + 144) \times \kappa \times 2^{-\mu_1} \times T_C \qquad (4)$$

For another example, when x is equal to 2, the foregoing formula (3) is changed to the following formula (5):

$$T_2 = (N_{SL} + d_{SL} + 2) \times (2048 + 144) \times K \times 2^{-\mu_1} \times T_C \qquad (5)$$

For another example, when x is equal to 3, the foregoing formula (3) is changed to the following formula (6):

$$T_2 = (N_{SL} + d_{SL} + 3) \times (2048 + 144) \times \kappa \times 2^{-\mu_1} \times T_C \qquad (6)$$

Optionally, x may vary with the subcarrier spacing. When the subcarrier spacing is relatively large, a value of x is relatively large. Table 2 shows an example of a correspondence table between x and the subcarrier spacing.

TABLE 2

| Subcarrier spacing | x |
| --- | --- |
| 15 kHz | 1 |
| 30 kHz | 3 |

It should be understood that Table 2 is merely an example, and should not constitute any limitation on a correspondence between x and the subcarrier spacing.

It should be understood that the foregoing formula (3) is merely an example. In the embodiments of this application, $T_2$, $N_{SL}$, $d_{SL}$, and x may alternatively satisfy another function relationship. This is not limited in the embodiments of this application.

The third time domain offset value is determined by using the foregoing formula (3), so that efficiency and accuracy of determining the third time domain offset value can be improved.

Optionally, in some embodiments of this application, when the second channel and a fifth channel overlap in time domain, a fourth time domain offset value is a time domain offset value between the third channel and a channel with an earlier time domain position in the second channel and the fifth channel, that is, the time domain offset value between the third channel and the channel with the earlier time domain position in the second channel and the fifth channel is the fourth time domain offset value. The fourth time domain offset value may be understood as a time domain offset value between a time unit in which a start symbol (the first symbol) of the third channel is located and an end symbol (the last symbol) of the channel with the earlier time domain position in the second channel and the fifth channel. The time unit in which the symbol is located may include a symbol, a subframe, a slot, or the like. The fourth time domain offset value may be determined based on the second subcarrier spacing and/or the processing capability information of the first terminal device, and the third channel. For the processing capability information of the first terminal device, the second subcarrier spacing, and the third channel, refer to the foregoing descriptions. For brevity, details are not described herein again.

It should be understood that, that the second channel and a fifth channel overlap in time domain may be understood as that the second channel and the fifth channel have at least one same symbol (for example, an OFDM symbol) in time domain.

It should be further understood that the channel with the earlier time domain position in the second channel and the fifth channel may be a channel with an earlier start position in the second channel and the fifth channel.

In the embodiments of this application, when the second channel and the fifth channel overlap in time domain, the fourth time domain offset value between the third channel and the channel with the earlier time domain position in the second channel and the fifth channel is determined based on the second subcarrier spacing and/or the processing capability information of the first terminal device, and the third channel. When the second channel and the fifth channel are multiplexed, it can be ensured that the first terminal device has sufficient time to perform channel multiplexing processing, thereby ensuring reliability of multiplexing the second channel and the fifth channel, and ensuring normal transmission of the HARQ information.

In some possible implementations of this application, when the network device or the third terminal device and the first terminal device determine the fourth time domain offset value based on the second subcarrier spacing and/or the processing capability information of the first terminal device, and the third channel, the fourth time domain offset value may be determined according to the following formula (7):

$$T_3 = (N_{SL\text{-}to\text{-}UL} + d_{SL\text{-}to\text{-}UL} + y) \times (2048 + 144) \times \kappa \times 2^{-\mu_1} \times T_C \qquad (7)$$

$T_3$ is the fourth time domain offset value; $N_{SL\text{-}to\text{-}UL}$ is a quantity of symbols that is determined based on the second subcarrier spacing and/or the processing capability information of the first terminal device; $d_{SL\text{-}to\text{-}UL}$ is a quantity of symbols that is determined based on the third channel and/or the processing capability information of the first terminal device; $T_c$ is a first time unit; $T_s$ is a second time unit; $\kappa$ is a ratio of $T_s$ to $T_c$; and $\mu_2$ is the second subcarrier spacing. For meanings of the parameters, refer to the foregoing descriptions. For brevity, details are not described herein again.

y is a positive integer. y may be a variable or a constant. For example, y may be 1, 2, or 3. Alternatively, y may be determined based on the second subcarrier spacing and/or processing capability information of the second terminal device. Alternatively, y may be determined based on the third channel.

For example, when y is equal to 1, the foregoing formula (7) is changed to the following formula (8):

$$T_3 = (N_{SL\text{-}to\text{-}UL} + d_{SL\text{-}to\text{-}UL} + 1) \times (2048 + 144) \times \kappa \times 2^{-\mu_1} \times T_C \qquad (8)$$

For another example, when y is equal to 2, the foregoing formula (7) is changed to the following formula (9):

$$T_3 = (N_{SL\text{-}to\text{-}UL} + d_{SL\text{-}to\text{-}UL} + 2) \times (2048 + 144) \times \kappa \times 2^{-\mu_1} \times T_C \quad (9)$$

For another example, when y is equal to 3, the foregoing formula (7) is changed to the following formula (10):

$$T_3 = (N_{SL\text{-}to\text{-}UL} + d_{SL\text{-}to\text{-}UL} + 3) \times (2048 + 144) \times \kappa \times 2^{-\mu_1} \times T_C \quad (10)$$

Optionally, y may vary with the subcarrier spacing. When the subcarrier spacing is relatively large, a value of y is relatively large. Table 3 shows an example of a correspondence table between y and the subcarrier spacing.

TABLE 3

| Subcarrier spacing | y |
|---|---|
| 15 kHz | 1 |
| 30 kHz | 3 |

It should be understood that Table 3 is merely an example, and should not constitute any limitation on a correspondence between y and the subcarrier spacing.

It should be understood that the foregoing formula (7) is merely an example. In the embodiments of this application, $T_3$, $N_{SL\text{-}to\text{-}UL}$, $d_{SL\text{-}to\text{-}UL}$, and y may alternatively satisfy another function relationship. This is not limited in the embodiments of this application.

The fourth time domain offset value is determined by using the foregoing formula (7), so that efficiency and accuracy of determining the fourth time domain offset value can be improved.

In the embodiments of this application, optionally, the fifth channel and the fourth channel may be a same channel; or the fifth channel and the fourth channel may be different channels.

Figure 8:
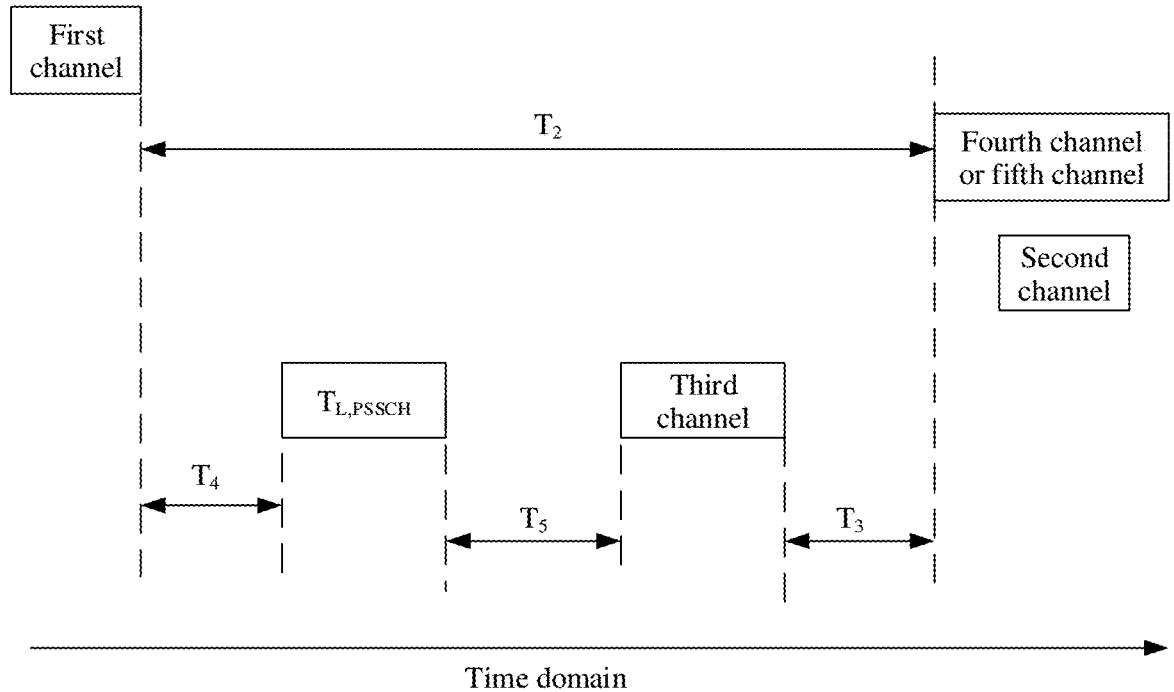
FIG. 8 is an example of a schematic diagram of a third time domain offset value and a fourth time domain offset value when a fifth channel and a fourth channel are a same channel according to an embodiment of this application.

For example, FIG. 8 is an example of a schematic diagram of the third time domain offset value and the fourth time domain offset value when the fifth channel and the fourth channel are a same channel. As shown in FIG. 8, $T_{L,PSSCH}$ is a time length occupied in time domain by the sidelink shared channel carrying the sidelink data scheduled on the first channel, $T_4$ is a time domain offset value between the first channel and the PSSCH, and $T_5$ is a time domain offset value between the PSSCH and the third channel. The third time domain offset value is $T_2$, and the fourth time domain offset value is $T_3$.

It should be understood that FIG. 8 is merely an example, and should not constitute any limitation on the embodiments of this application.

It should be understood that, in the embodiments of this application, when the fifth channel and the fourth channel may be a same channel, both the formula (3) and the formula (7) may be satisfied; or either the formula (3) or the formula (7) may be satisfied.

Optionally, in some embodiments of this application, with reference to the example shown in FIG. 6, when the following relational expression (11) is satisfied, the first terminal device sends, on the second channel, the HARQ information to the network device or the third terminal device.

$$T_4 + T_{L,PSSCH} + T_5 + T_{L,CH3} + T_1 \leq T_0 \quad (11)$$

$T_4$ is a time domain offset value between the first channel and the PSSCH, and $T_4$ may be understood as a time domain offset value between a time unit in which a start symbol (the first symbol) of the first channel is located and a time unit in which an end symbol (the last symbol) of the PSSCH is located. $T_5$ is a time domain offset value between the PSSCH and the third channel; and $T_5$ may be understood as a time domain offset value between a time unit in which a start symbol (the first symbol) of the PSSCH is located and a time unit in which an end symbol (the last symbol) of the third channel is located. $T_{L,PSSCH}$ is a time length occupied by the sidelink shared channel in time domain; and $T_{L,CH3}$ is a time length occupied by the third channel in time domain.

Specifically, when the relational expression (11) is satisfied, a time length from a time at which the network device completes sending the sidelink scheduling information to a time at which the network device receives the HARQ information, namely, a time length $T_0$ from a time at which the first terminal device completes receiving the sidelink scheduling information to a time at which the first terminal device sends the HARQ information to the network device or the third terminal device is greater than or equal to: a sum of a time length $T_4$ used by the first terminal device to prepare the sidelink data, the time length $T_{L,PSSCH}$ occupied by the PSSCH carrying the sidelink data, a time length $T_5$ used by the second terminal device to process the sidelink data and generate the HARQ information, and the time length occupied by the third channel carrying the HARQ information. In this way, it can be ensured that the first terminal device has sufficient time to prepare, process, and report the HARQ information, thereby ensuring that the data retransmission mechanism on the sidelink can be effectively implemented.

It should be understood that, in the embodiments of this application, one or more of $T_0$, $T_1$, $T_2$, and $T_3$ may include a timing advance (timing advance, TA).

It should be understood that division of modes, cases, types, and embodiments in the embodiments of this application are merely for ease of description, but should not constitute any special limitation, and features in various modes, types, cases, and embodiments may be combined when there is no contradiction.

It should be further understood that numerical symbols used in the embodiments of this application are differentiated merely for ease of description, but are not used to limit the scope of the embodiments of this application. Sequence numbers of the foregoing processes do not indicate an execution sequence. The execution sequence of the processes should be determined based on functions and internal logic of the processes, and should not constitute any limitation on the implementation processes of the embodiments of this application.

It should be further understood that the foregoing descriptions are merely intended to help a person skilled in the art better understand the embodiments of this application, but are not intended to limit the scope of the embodiments of this application. It is clear that a person skilled in the art may make various equivalent modifications or changes based on the foregoing examples. For example, some steps in the foregoing method 200 may be unnecessary, or some steps may be newly added. Alternatively, any two or more of the foregoing embodiments may be combined. Such a modified, changed, or combined solution also falls within the scope of the embodiments of this application.

It should be further understood that, the foregoing descriptions of the embodiments of this application focus on a difference between the embodiments. For same or similar parts that are not mentioned, refer to each other. For brevity, details are not described herein again.

It should be further understood that in the embodiments of this application, "predefinition" may be implemented by pre-storing corresponding code or a corresponding table in a device (for example, a terminal device or a network device) or in another way that can be used to indicate related information. A specific implementation of "predefinition" is not limited in this application.

The methods in the embodiments of this application are described above in detail with reference to FIG. 1 to FIG. 8. Communications apparatuses in the embodiments of this application are described below with reference to FIG. 9 to FIG. 15. It should be understood that the communications apparatuses in FIG. 9 to FIG. 15 can perform the steps of the method in the embodiments of this application.

Figure 9:
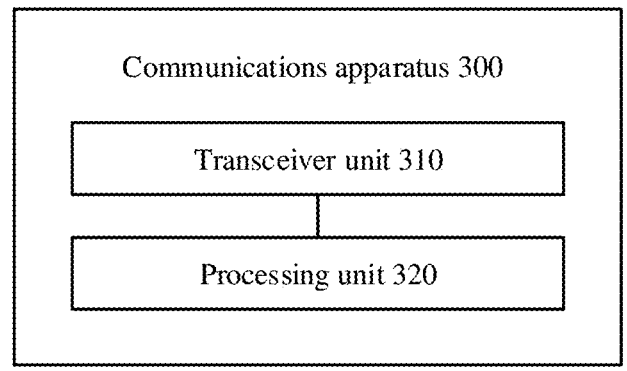
FIG. 9 is a schematic block diagram of a communications apparatus according to an embodiment of this application.

FIG. 9 is a schematic block diagram of a communications apparatus 300 according to an embodiment of this application. The apparatus 300 may correspond to the third terminal device or the network device described in the embodiments of the foregoing methods, or may be a chip or a component used in the third terminal device or the network device. In addition, each module or unit in the apparatus 300 is configured to perform an action or a processing process performed by the third terminal device or the network device in the foregoing method 200 and the embodiments. As shown in FIG. 8, the communications apparatus 300 may include a transceiver unit 310 and a processing unit 320.

The transceiver unit 310 is configured to send sidelink scheduling information to a first terminal device on a first channel, where the sidelink scheduling information is used to schedule the first terminal device to send sidelink data to a second terminal device on a sidelink, and the sidelink is a communications link between the first terminal device and the second terminal device.

The processing unit 320 is configured to determine a second channel, where the second channel is used to receive, from the first terminal device, hybrid automatic repeat request HARQ information for the sidelink data.

According to the communications apparatus provided in this application, after sending the sidelink scheduling information to the first terminal device on the first channel, the communications apparatus determines a position of the second channel, so that the communications apparatus may determine that the HARQ information for the sidelink data scheduled on the first channel is received on the second channel. In this way, the communications apparatus receives the HARQ information on time, and it is specified that the HARQ information is for a HARQ process in which scheduling is performed on the first channel. Therefore, it is ensured that a data retransmission mechanism on the sidelink can be effectively implemented, reliability of data transmission on the sidelink is ensured, and communication efficiency is improved.

Optionally, in some embodiments of this application, the processing unit 320 is further configured to determine the second channel based on the first channel and a first hybrid automatic repeat request HARQ timing, where the first HARQ timing is an offset value between the second channel and the first channel in time domain.

Optionally, in some embodiments of this application, the first HARQ timing is greater than or equal to a first time domain offset value, and the processing unit 320 is further configured to determine the first time domain offset value based on a first subcarrier spacing and/or processing capability information of the first terminal device, and a sidelink shared channel and/or a third channel, where the sidelink shared channel is used to carry the sidelink data, and the third channel is used to carry the HARQ information sent by the second terminal device to the first terminal device; and the first subcarrier spacing is one of the following:
a subcarrier spacing corresponding to the first channel;
a subcarrier spacing corresponding to the second channel;
a subcarrier spacing corresponding to the sidelink shared channel; and
a smallest value among the subcarrier spacing corresponding to the first channel, the subcarrier spacing corresponding to the sidelink shared channel, and the subcarrier spacing corresponding to the second channel.

Optionally, in some embodiments of this application, the processing unit 320 is further configured to determine the first time domain offset value $T_0$ according to the following formula (1):

$$T_0 = (N_{SL} + d_{SL}) \times (2048 + 144) \times \kappa \times 2^{-\mu_1} \times T_C \qquad (1)$$

$N_{SL}$ is a quantity of symbols that is determined based on the first subcarrier spacing and/or the processing capability information of the first terminal device; $d_{SL}$ is a quantity of symbols that is determined based on at least one of the sidelink shared channel, the third channel, and the processing capability information of the first terminal device; $T_c$ is a first time unit; $T_s$ is a second time unit; $\kappa$ is a ratio of $T_s$ to $T_c$; and $\mu_1$ is the first subcarrier spacing.

Optionally, in some embodiments of this application, the processing unit 320 is further configured to determine the second channel based on a third channel and a second hybrid automatic repeat request HARQ timing, where the second HARQ timing is an offset value between the second channel and the third channel in time domain, and the third channel is used to carry the HARQ information sent by the second terminal device to the first terminal device.

Optionally, in some embodiments of this application, the second HARQ timing is greater than or equal to a second time domain offset value, and the processing unit 320 is further configured to determine the second time domain offset value based on a second subcarrier spacing and/or processing capability information of the first terminal device, and the third channel; and the second subcarrier spacing is one of the following:
a subcarrier spacing corresponding to the first channel;
a subcarrier spacing corresponding to a sidelink shared channel;
a subcarrier spacing corresponding to the third channel;
a subcarrier spacing corresponding to the second channel; and
a smallest value among the subcarrier spacing corresponding to the first channel, the subcarrier spacing corresponding to the sidelink shared channel, the subcarrier spacing corresponding to the third channel, and the subcarrier spacing corresponding to the second channel, where
the sidelink shared channel is used to carry the sidelink data.

Optionally, in some embodiments of this application, the processing unit 320 is further configured to determine the second time domain offset value $T_1$ according to the following formula (2):

$$T_1 = (N_{SL\text{-}to\text{-}UL} + d_{SL\text{-}to\text{-}UL}) \times (2048 + 144) \times K \times 2^{-\mu_1} \times T_C \qquad (2)$$

$N_{SL\text{-}to\text{-}UL}$ is a quantity of symbols that is determined based on the second subcarrier spacing and/or the processing capability information of the first terminal device; $d_{SL\text{-}to\text{-}UL}$ is a quantity of symbols that is determined based on the third channel and/or the processing capability information of the first terminal device; $T_c$ is a first time unit; $T_s$ is a second time unit; κ is a ratio of $T_s$ to $T_c$; and $μ_2$ is the second subcarrier spacing.

Optionally, in some embodiments of this application, when the second channel and a fourth channel overlap in time domain, a third time domain offset value is a time domain offset value between the first channel and a channel with an earlier time domain position in the second channel and the fourth channel; and the processing unit 320 is further configured to determine the third time domain offset value based on the first subcarrier spacing and/or the processing capability information of the first terminal device, and the sidelink shared channel and/or the third channel.

Optionally, in some embodiments of this application, the processing unit 320 is further configured to determine the third time domain offset value $T_2$ according to the following formula (3):

$$T_2 = (N_{SL} + d_{SL} + x) \times (2048 + 144) \times K \times 2^{-μ_1} \times T_C \quad (3)$$

x is a positive integer.

Optionally, in some embodiments of this application, when the second channel and a fifth channel overlap in time domain, a fourth time domain offset value is a time domain offset value between the third channel and a channel with an earlier time domain position in the second channel and the fifth channel; and the processing unit 320 is further configured to determine the fourth time domain offset value based on the second subcarrier spacing and/or the processing capability information of the first terminal device, and the third channel.

Optionally, in some embodiments of this application, the processing unit 320 is further configured to determine the fourth time domain offset value $T_3$ according to the following formula (7):

$$T_3 = (N_{SL\text{-}to\text{-}UL} + d_{SL\text{-}to\text{-}UL} + y) \times (2048 + 144) \times κ \times 2^{-μ_1} \times T_C \quad (7)$$

y is a positive integer.

Optionally, in some embodiments of this application, when the following relational expression (11) is satisfied:

$$T_4 + T_{L,PSSCH} + T_5 + T_{L,CH3} + T_1 \leq T_0 \quad (11)$$

and the transceiver unit 310 is further configured to receive the HARQ information on the second channel.

$T_4$ is a time domain offset value between the first channel and the sidelink shared channel; $T_5$ is a time domain offset value between the sidelink shared channel and the third channel; $T_{L,PSSCH}$ is a time length occupied by the sidelink shared channel in time domain; and $T_{L,CH3}$ is a time length occupied by the third channel in time domain.

It should be understood that for a specific process in which the units in the apparatus 300 perform the foregoing corresponding steps, refer to related descriptions of the network device or the third terminal device in the foregoing method embodiments with reference to FIG. 3 to FIG. 7. For brevity, details are not described herein again.

Optionally, the transceiver unit 310 may include a receiving unit (module) and a sending unit (module), configured to perform the steps of sending information and receiving information that are performed by the third terminal device or the network device in the foregoing method embodiments and the embodiments shown in FIG. 3, FIG. 4, FIG. 5, and FIG. 7. Optionally, the communications apparatus 300 may further include a storage unit, configured to store instructions to be executed by the transceiver unit 310 and the processing unit 320. The transceiver unit 310, the processing unit 320, and the storage unit are in communication connection. The storage unit stores the instruction. The processing unit 320 is configured to execute the instruction stored in the storage unit. The transceiver unit 310 is configured to perform specific signal sending and receiving under driving of the processing unit 320.

Figure 10:
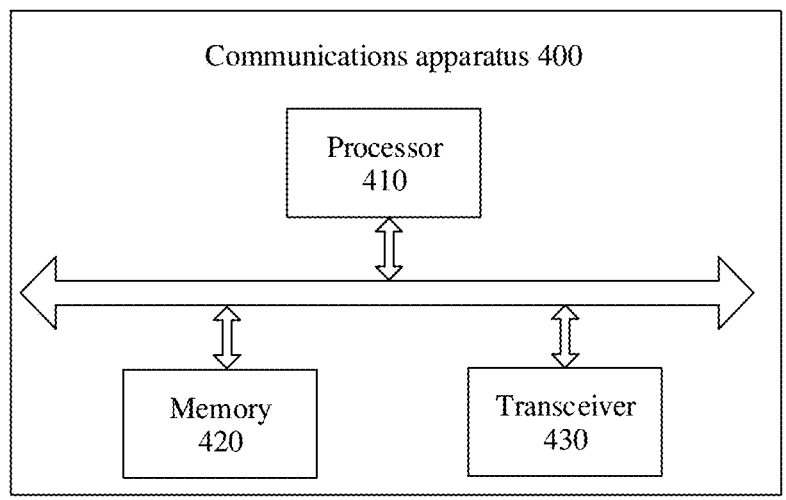
FIG. 10 is another example of a schematic block diagram of a communications apparatus according to an embodiment of this application.

It should be understood that, the transceiver unit 310 may be implemented by using a transceiver, the processing unit 320 may be implemented by using a processor, and the storage unit may be implemented by using a memory. As shown in FIG. 10, a communications apparatus 400 may include a processor 410, a memory 420, and a transceiver 430.

The communications apparatus 300 shown in FIG. 9 or the communications apparatus 400 shown in FIG. 10 can implement the steps performed by the third terminal device or the network device in the foregoing method embodiments and the embodiments shown in FIG. 3, FIG. 4, FIG. 5, and FIG. 7. For similar descriptions, refer to the descriptions in the foregoing corresponding methods. To avoid repetition, details are not described herein again.

It should be further understood that the communications apparatus 300 shown in FIG. 9 or the communications apparatus 400 shown in FIG. 10 may be a terminal device or a network device.

Figure 11:
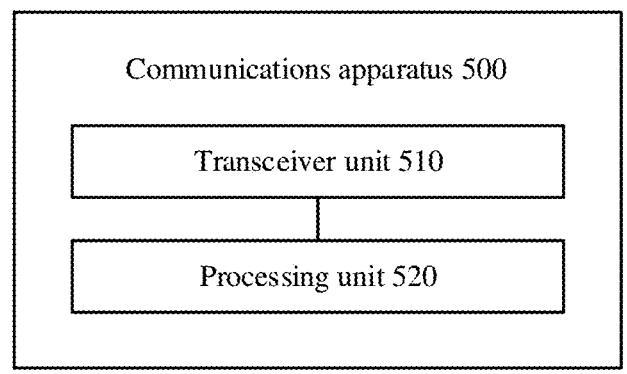
FIG. 11 is still another example of a schematic block diagram of a communications apparatus according to an embodiment of this application.

FIG. 11 is a schematic block diagram of a communications apparatus 500 according to an embodiment of this application. The apparatus 500 may correspond to the first terminal device described in the embodiments of the foregoing methods, or may be a chip or a component used in the first terminal device or the network device. In addition, each module or unit in the apparatus 500 is configured to perform an action or a processing process performed by the first terminal device in the foregoing method 200 and the embodiments. As shown in FIG. 11, the communications apparatus 500 may include a transceiver unit 510 and a processing unit 520.

The transceiver unit 510 is configured to receive sidelink scheduling information on a first channel, where the sidelink scheduling information is used to schedule the first terminal device to send sidelink data to a second terminal device on a sidelink, and the sidelink is a communications link between the first terminal device and the second terminal device.

The transceiver unit 510 is further configured to receive HARQ information that is for the sidelink data and that is sent by the second terminal device.

The processing unit 520 is configured to determine a second channel, where the second channel is used by the first terminal device to send the HARQ information.

According to the communications apparatus provided in this application, after receiving the sidelink scheduling information on the first channel, the communications apparatus determines a position of the second channel, so that the communications apparatus may determine to send, on the second channel, the HARQ information for the sidelink data scheduled on the first channel. In this way, the communications apparatus sends the HARQ information on time, and it is specified that the HARQ information is for a HARQ process in which scheduling is performed on the first channel. Therefore, it is ensured that a data retransmission mechanism on the sidelink can be effectively implemented, reliability of data transmission on the sidelink is ensured, and communication efficiency is improved.

Optionally, in some embodiments of this application, the processing unit 520 is further configured to determine the second channel based on the first channel and a first hybrid automatic repeat request HARQ timing, where the first HARQ timing is an offset value between the second channel and the first channel in time domain.

Optionally, in some embodiments of this application, the first HARQ timing is greater than or equal to a first time domain offset value, and the processing unit 520 is further configured to determine the first time domain offset value based on a first subcarrier spacing and/or processing capability information of the first terminal device, and a sidelink shared channel and/or a third channel, where the sidelink shared channel is used to carry the sidelink data, and the third channel is used to carry the HARQ information sent by the second terminal device to the first terminal device; and the first subcarrier spacing is one of the following:
a subcarrier spacing corresponding to the first channel;
a subcarrier spacing corresponding to the second channel;
a subcarrier spacing corresponding to the sidelink shared channel; and
a smallest value among the subcarrier spacing corresponding to the first channel, the subcarrier spacing corresponding to the sidelink shared channel, and the subcarrier spacing corresponding to the second channel.

Optionally, in some embodiments of this application, the processing unit 520 is further configured to determine the first time domain offset value $T_0$ according to the following formula (1):

$$T_0 = (N_{SL} + d_{SL}) \times (2048 + 144) \times \kappa \times 2^{-\mu_1} \times T_C \qquad (1)$$

$N_{SL}$ is a quantity of symbols that is determined based on the first subcarrier spacing and/or the processing capability information of the first terminal device; $d_{SL}$ is a quantity of symbols that is determined based on at least one of the sidelink shared channel, the third channel, and the processing capability information of the first terminal device; $T_c$ is a first time unit; $T_s$ is a second time unit; $\kappa$ is a ratio of $T_s$ to $T_c$; and $\mu_1$ is the first subcarrier spacing.

Optionally, in some embodiments of this application, the processing unit 520 is further configured to determine the second channel based on a third channel and a second hybrid automatic repeat request HARQ timing, where the second HARQ timing is an offset value between the second channel and the third channel in time domain, and the third channel is used to carry the HARQ information sent by the second terminal device to the first terminal device.

Optionally, in some embodiments of this application, the second HARQ timing is greater than or equal to a second time domain offset value, and the processing unit 520 is further configured to determine the second time domain offset value based on a second subcarrier spacing and/or processing capability information of the first terminal device, and the third channel; and the second subcarrier spacing is one of the following:
a subcarrier spacing corresponding to the first channel;
a subcarrier spacing corresponding to a sidelink shared channel;
a subcarrier spacing corresponding to the third channel;
a subcarrier spacing corresponding to the second channel; and
a smallest value among the subcarrier spacing corresponding to the first channel, the subcarrier spacing corresponding to the sidelink shared channel, the subcarrier spacing corresponding to the third channel, and the subcarrier spacing corresponding to the second channel, where the sidelink shared channel is used to carry the sidelink data.

Optionally, in some embodiments of this application, the processing unit 520 is further configured to determine the second time domain offset value $T_1$ according to the following formula (2):

$$T_1 = (N_{SL\text{-}to\text{-}UL} + d_{SL\text{-}to\text{-}UL}) \times (2048 + 144) \times K \times 2^{-\mu_1} \times T_C \qquad (2)$$

$N_{SL\text{-}to\text{-}UL}$ is a quantity of symbols that is determined based on the second subcarrier spacing and/or the processing capability information of the first terminal device; $d_{SL\text{-}to\text{-}UL}$ is a quantity of symbols that is determined based on the third channel and/or the processing capability information of the first terminal device; $T_c$ is a first time unit; $T_s$ is a second time unit; $\kappa$ is a ratio of $T_s$ to $T_c$; and $\mu_2$ is the second subcarrier spacing.

Optionally, in some embodiments of this application, when the second channel and a fourth channel overlap in time domain, a third time domain offset value is a time domain offset value between the first channel and a channel with an earlier time domain position in the second channel and the fourth channel; and the processing unit 520 is further configured to determine the third time domain offset value based on the first subcarrier spacing and/or the processing capability information of the first terminal device, and the sidelink shared channel and/or the third channel.

Optionally, in some embodiments of this application, the processing unit 520 is further configured to determine the third time domain offset value $T_2$ according to the following formula (3):

$$T_2 = (N_{SL} + d_{SL} + x) \times (2048 + 144) \times K \times 2^{-\mu_1} \times T_C \qquad (3)$$

x is a positive integer.

Optionally, in some embodiments of this application, when the second channel and a fifth channel overlap in time domain, a fourth time domain offset value is a time domain offset value between the third channel and a channel with an earlier time domain position in the second channel and the fifth channel; and the processing unit 520 is further configured to determine the fourth time domain offset value based on the second subcarrier spacing and/or the processing capability information of the first terminal device, and the third channel.

Optionally, in some embodiments of this application, the processing unit 520 is further configured to determine the fourth time domain offset value $T_3$ according to the following formula (7):

$$T_3 = (N_{SL\text{-}to\text{-}UL} + d_{SL\text{-}to\text{-}UL} + y) \times (2048 + 144) \times \kappa \times 2^{-\mu_1} \times T_C \qquad (7)$$

y is a positive integer.

Optionally, in some embodiments of this application, when the following relational expression (11) is satisfied:

$$T_4 + T_{L,PSSCH} + T_5 + T_{L,CH3} + T_1 \leq T_0 \qquad (11)$$

and the transceiver unit 510 is further configured to send the HARQ information on the second channel.

$T_4$ is a time domain offset value between the first channel and the sidelink shared channel; $T_5$ is a time domain offset value between the sidelink shared channel and the third channel; $T_{L,PSSCH}$ is a time length occupied by the sidelink shared channel in time domain; and $T_{L,CH3}$ is a time length occupied by the third channel in time domain.

It should be understood that for a specific process in which the units in the apparatus 500 perform the foregoing corresponding steps, refer to related descriptions of the first terminal device in the foregoing method embodiments with reference to FIG. 3 to FIG. 7. For brevity, details are not described herein again.

Optionally, the transceiver unit 510 may include a receiving unit (module) and a sending unit (module), configured to perform the steps of sending information and receiving information that are performed by the first terminal device in the foregoing method embodiments and the embodiments shown in FIG. 3, FIG. 4, FIG. 5, and FIG. 7. Optionally, the communications apparatus 500 may further include a storage unit, configured to store instructions to be executed by the transceiver unit 510 and the processing unit 520. The transceiver unit 510, the processing unit 520, and the storage unit are in communication connection. The storage unit stores the instruction. The processing unit 520 is configured to execute the instruction stored in the storage unit. The transceiver unit 510 is configured to perform specific signal sending and receiving under driving of the processing unit 520.

Figure 12:
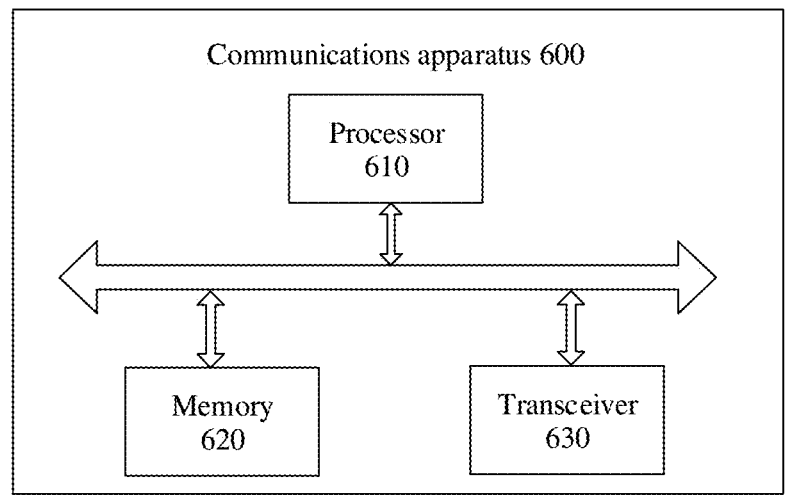
FIG. 12 is another example of a schematic block diagram of a communications apparatus according to an embodiment of this application.

It should be understood that, the transceiver unit 510 may be implemented by using a transceiver, the processing unit 520 may be implemented by using a processor, and the storage unit may be implemented by using a memory. As shown in FIG. 12, a communications apparatus 600 may include a processor 610, a memory 620, and a transceiver 630.

The communications apparatus 500 shown in FIG. 11 or the communications apparatus 600 shown in FIG. 12 can implement the steps performed by the first terminal device in the foregoing method embodiments and the embodiments shown in FIG. 3, FIG. 4, FIG. 5, and FIG. 7. For similar descriptions, refer to the descriptions in the foregoing corresponding methods. To avoid repetition, details are not described herein again.

It should be further understood that the communications apparatus 500 shown in FIG. 11 or the communications apparatus 600 shown in FIG. 12 may be a terminal device.

It should be further understood that division into the units in the apparatuses is merely logical function division. In an actual implementation, all or some of the units may be integrated into one physical entity, or may be physically separated. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be a separately disposed processing element, or may be integrated into a chip of the apparatus for implementation. Alternatively, each unit may be stored in a memory in a form of a program to be invoked by a processing element of the apparatus to perform a function of the unit. The processing element herein may also be referred to as a processor, and may be an integrated circuit having a signal processing capability. In an implementation process, the steps of the foregoing methods or the foregoing units may be implemented by using a hardware integrated logic circuit of the processor element, or may be implemented in a form of software invoked by the processing element.

In an example, a unit in any one of the foregoing apparatuses may be one or more integrated circuits configured to implement the foregoing methods, for example, one or more application-specific integrated circuits (application specific integrated circuit, ASIC), one or more digital signal processors (DSP), one or more field programmable gate arrays (FPGA), or a combination of at least two of these integrated circuits. For another example, when the unit in the apparatus is implemented by scheduling a program by a processing element, the processing element may be a general purpose processor, for example, a central processing unit (CPU) or another processor that can invoke the program. For still another example, the units may be integrated and implemented in a form of a system-on-a-chip (SOC).

Figure 13:
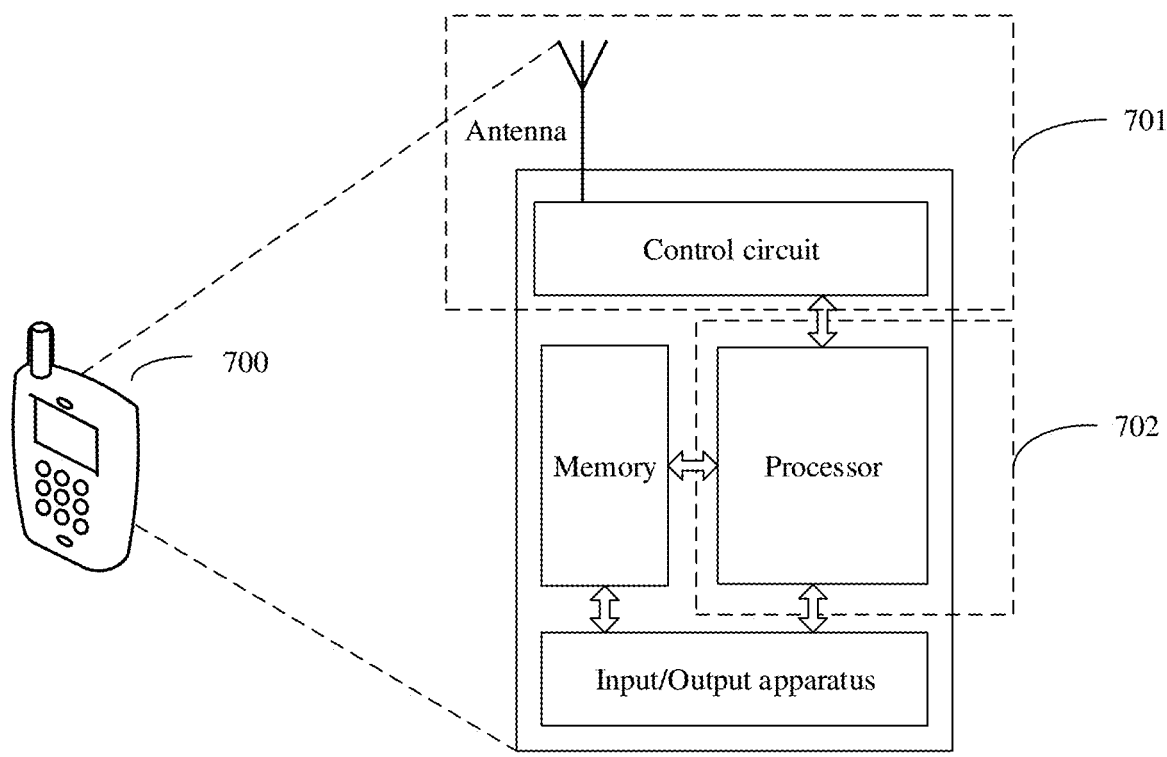
FIG. 13 is a schematic block diagram of a terminal device according to an embodiment of this application.

FIG. 13 is a schematic structural diagram of a terminal device 700 according to this application. The apparatus 300, 400, 500, or 600 may be configured in the terminal device 700; or the apparatus 300, 400, 500, or 600 may be the terminal device 700. In other words, the terminal device 700 may perform an action performed by the first terminal device or the third terminal device in the foregoing method 200.

For ease of description, FIG. 13 shows only main components of the terminal device. As shown in FIG. 13, the terminal device 700 includes a processor, a memory, a control circuit, an antenna, and an input/output apparatus.

The processor is mainly configured to: process a communications protocol and communications data, control the entire terminal device, execute a software program, and process data of the software program. For example, the processor is configured to support the terminal device in performing the action described in the foregoing embodiment of the method. The memory is mainly configured to store the software program and the data, for example, store the codebook described in the foregoing embodiments. The control circuit is mainly configured to: perform conversion between a baseband signal and a radio frequency signal, and process the radio frequency signal. A combination of the control circuit and the antenna may also be referred to as a transceiver that is mainly configured to send and receive a radio frequency signal in a form of an electromagnetic wave. The input/output apparatus, such as a touchscreen, a display screen, or a keyboard, is mainly configured to receive data input by a user and output data to the user.

After the terminal device is powered on, the processor may read the software program in a storage unit, explain and execute an instruction of the software program, and process the data of the software program. When data needs to be sent in a wireless mode, after performing baseband processing on the to-be-sent data, the processor outputs a baseband signal to a radio frequency circuit. After performing radio frequency processing on the baseband signal, the radio frequency circuit sends a radio frequency signal to the outside through the antenna in a form of an electromagnetic wave. When data is sent to the terminal device, the radio frequency circuit receives a radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 13 shows only one memory and one processor. An actual terminal device may have a plurality of processors and a plurality of memories. The memory may also be referred to as a storage medium, a storage device, or the like. This is not limited in the embodiments of this application.

For example, the processor may include a baseband processor and a central processing unit. The baseband processor is mainly configured to process the communications protocol and the communications data. The central processing unit is mainly configured to: control the entire terminal device, execute the software program, and process the data of the software program. The processor in FIG. 13 integrates functions of the baseband processor and the central processing unit. A person skilled in the art may understand that the baseband processor and the central processing unit may alternatively be independent processors, and are interconnected by using technologies such as a bus. A person skilled in the art may understand that the terminal device may include a plurality of baseband processors to adapt to different network standards, the terminal device may include a plurality of central processing units to improve a processing capability of the terminal device, and the components of the terminal device may be connected through various buses. The baseband processor may also be expressed as a baseband processing circuit or a baseband processing chip. The central processing unit may also be expressed as a central processing circuit or a central processing chip. A function of processing the communications protocol and the communications data may be embedded into the processor, or may be stored in a storage unit in a form of a software program. The processor executes the software program to implement a baseband processing function.

For example, in this embodiment of this application, the antenna and the control circuit that have sending and receiving functions may be considered as a transceiver unit 701 of the terminal device 700, and the processor having a processing function may be considered as a processing unit 702 of the terminal device 700. As shown in FIG. 13, the terminal device 700 includes the transceiver unit 701 and the processing unit 202. The transceiver unit may also be referred to as a transceiver, a transceiver machine, a transceiver apparatus, or the like. Optionally, a component that is in the transceiver unit 701 and that is configured to implement a receiving function may be considered as a receiving unit, and a component that is in the transceiver unit 701 and that is configured to implement a sending function may be considered as a sending unit. In other words, the transceiver unit 701 includes the receiving unit and the sending unit. For example, the receiving unit may also be referred to as a receiver machine, a receiver, a receive circuit, or the like, and the sending unit may be referred to as a transmitter machine, a transmitter, a transmit circuit, or the like.

Figure 14:
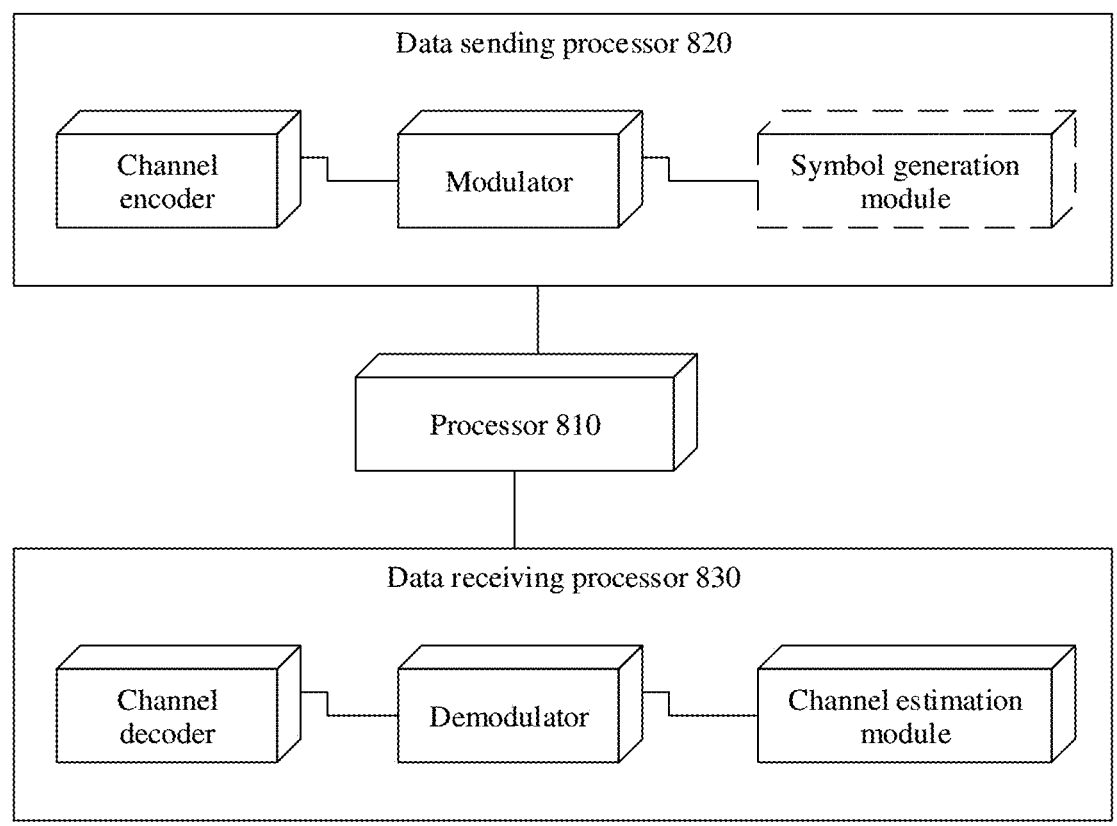
FIG. 14 is another example of a schematic block diagram of a terminal device according to an embodiment of this application.

FIG. 14 is a schematic structural diagram of a terminal device 800 according to this application. In FIG. 14, the terminal device includes a processor 810, a data sending processor 820, and a data receiving processor 830. The processing unit 320 and the processing unit 520 in the foregoing embodiments may be the processor 810 in FIG. 14, to implement a corresponding function. The transceiver unit 510 in the foregoing embodiment may be the data sending processor 820 and/or the data receiving processor 830 in FIG. 14. Although a channel encoder and a channel decoder are shown in FIG. 14, it may be understood that the modules are merely examples, and do not constitute any limitation on the embodiments.

Figure 15:
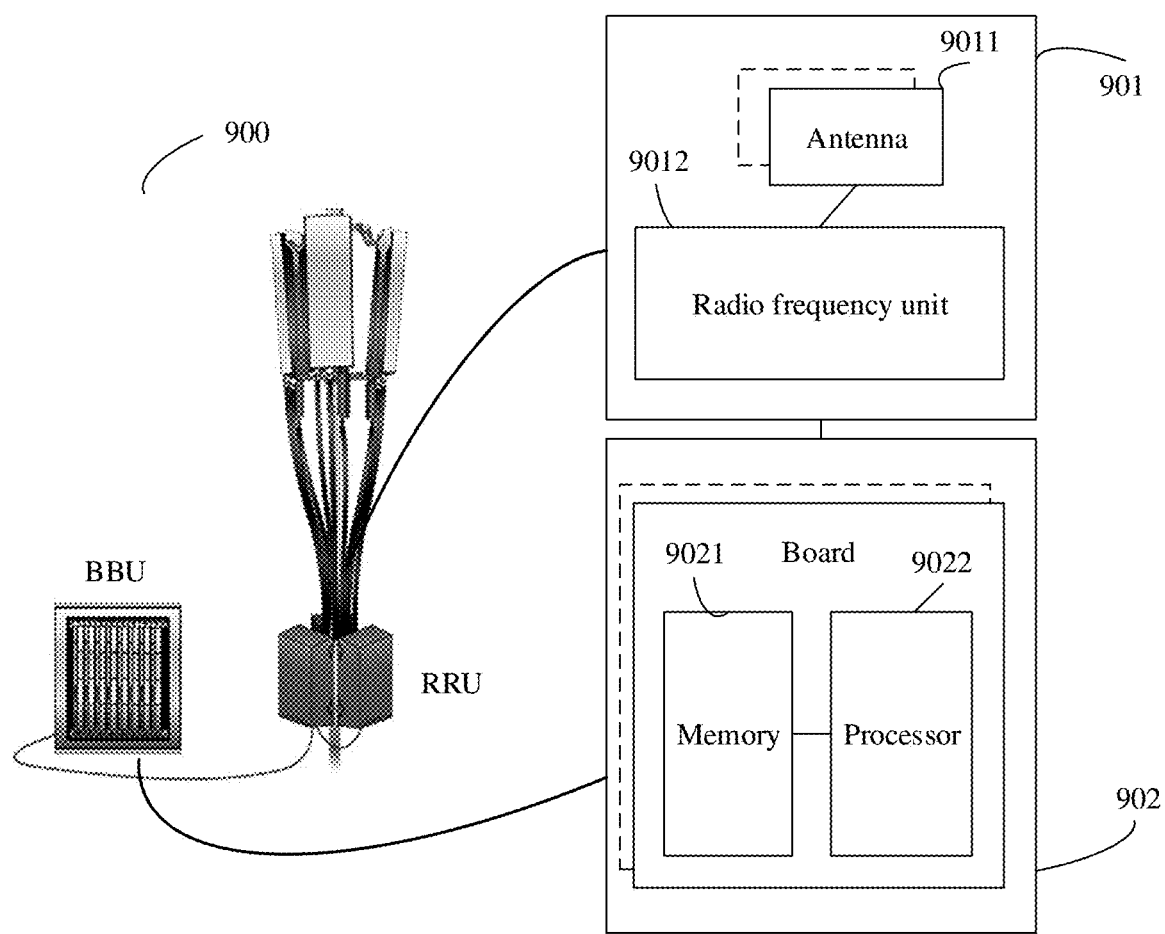
FIG. 15 is a schematic block diagram of a network device according to an embodiment of this application.

FIG. 15 is a schematic structural diagram of a network device 900 according to an embodiment of this application. The network device 900 may be configured to implement a function of the network device in the foregoing method. The network device 900 includes one or more radio frequency units such as a remote radio unit (RRU) 901 and one or more baseband units (BBU) (which may also be referred to as digital units, DUs) 902. The RRU 901 may be referred to as a transceiver unit, a transceiver machine, a transceiver circuit, a transceiver, or the like, and may include at least one antenna 9011 and a radio frequency unit 9012. The RRU 901 is mainly configured to: send and receive a radio frequency signal and perform conversion between a radio frequency signal and a baseband signal. For example, the RRU 901 is configured to send the signaling message in the foregoing embodiment to a terminal device. The BBU 902 is mainly configured to: perform baseband processing, control a base station, and so on. The RRU 901 and the BBU 902 may be physically disposed together, or may be physically separated, that is, in a distributed base station.

The BBU 902 is a control center of the base station, may also be referred to as a processing unit, and is mainly configured to complete a baseband processing function such as channel encoding, multiplexing, modulation, or spreading. For example, the BBU (the processing unit) 902 may be configured to control a base station 900 to perform the operation procedure related to the network device in the foregoing method embodiments.

In an example, the BBU 902 may include one or more boards, and a plurality of boards may jointly support a radio access network (such as an LTE system or a 5G system) of a single access standard, or may separately support radio access networks of different access standards. The BBU 902 further includes a memory 9021 and a processor 9022. The memory 9021 is configured to store an instruction and data that are necessary. For example, the memory 9021 stores the codebook and the like in the foregoing embodiments. The processor 9022 is configured to control the base station to perform a necessary action. For example, the processor 9022 is configured to control the base station to perform an operation procedure related to the network device in the foregoing method embodiments. The memory 9021 and the processor 9022 may serve one or more boards. That is, a memory and a processor may be disposed on each board. Alternatively, a plurality of boards may share a same memory and a same processor. In addition, a necessary circuit may further be disposed on each board.

In a possible implementation, with development of a system-on-chip (SoC) technology, all or some functions of the BBU 902 and the RRU 901 may be implemented by using the SoC technology, for example, implemented by using a base station function chip. The base station function chip integrates components such as a processor, a memory, and an antenna port. A program of a base station-related function is stored in the memory. The processor executes the program to implement the base station-related function. Optionally, the base station function chip may alternatively read a memory outside the chip to implement the base station-related function.

It should be understood that the structure of the network device shown in FIG. 15 is merely a possible form, and should not constitute any limitation on the embodiments of this application. In this application, there may be a base station structure in another form in the future.

It should be understood that, the processor in the embodiments of this application may be a central processing unit (CPU), or may be another general purpose processor, a digital signal processor (DSP), an application-specific integrated circuit (application specific integrated circuit, ASIC), a field programmable gate array (FPGA) or another programmable logical device, a discrete gate or transistor logical device, a discrete hardware component, or the like. The general purpose processor may be a microprocessor, or the processor may be any conventional processor or the like.

It should further be understood that the memory in the embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), used as an external cache. Through example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the embodiments may be implemented by using software, hardware, firmware, or any combination thereof. When software is used to implement the embodiments, all or some of the embodiments may be implemented in a form of a computer program product. The computer program product includes one or more computer instructions or computer programs. When the computer instructions or the computer programs are loaded or executed on a computer, all or some of the procedures or functions according to the embodiments of this application are generated. The computer may be a general purpose computer, a special purpose computer, a computer network, or another programmable apparatus. The computer instruction may be stored in a computer-readable storage medium or may be transmitted from one computer-readable storage medium to another computer-readable storage medium. For example, the computer instruction may be transmitted from one website, computer, server, or data center to another website, computer, server, or data center in a wireless (for example, infrared, radio, or microwave) mode. The computer-readable storage medium may be any usable medium accessible by the computer, or a data storage device, such as a server or a data center, integrating one or more usable medium sets. The usable medium may be a magnetic medium (for example, a floppy disk, a hard disk, or a magnetic tape), an optical medium (for example, a DVD), or a semiconductor medium. The semiconductor medium may be a solid-state drive.

An embodiment of this application further provides a communications system. The communications system includes the foregoing first terminal device, the foregoing second terminal device, the foregoing third terminal device, and/or the foregoing network device.

An embodiment of this application further provides a computer-readable medium, configured to store computer program code. The computer program code includes an instruction used to perform the sidelink feedback information transmission method in the embodiment of the method 200 in this application. The readable medium may be a read-only memory (ROM) or a random access memory (RAM). This is not limited in this embodiment of this application.

This application further provides a computer program product. The computer program product includes an instruction. When the instruction is executed, the first terminal device, the third terminal device, and the network device are enabled to respectively perform operations corresponding to the first terminal device, the third terminal device, and the network device in the foregoing methods.

An embodiment of this application further provides a system chip. The system chip includes a processing unit and a communications unit. The processing unit may be, for example, a processor, and the communications unit may be, for example, an input/output interface, a pin, or a circuit. The processing unit may execute a computer instruction, so that a chip in a communications apparatus performs any sidelink feedback information transmission method provided in the foregoing embodiments of this application.

Optionally, any communications apparatus provided in the foregoing embodiments of this application may include the system chip.

Optionally, the computer instruction is stored in a storage unit.

Optionally, the storage unit is a storage unit, such as a register or a cache, inside the chip. Alternatively, the storage unit may be a storage unit, such as a ROM, another type of static storage device that can store static information and a static instruction, or a RAM, that is inside a terminal and that is outside the chip. The processor mentioned anywhere above may be a CPU, a microprocessor, an ASIC, or one or more integrated circuits configured to control program execution of the feedback information transmission method. The processing unit and the storage unit may be decoupled, are separately disposed on different physical devices, and are connected in a wired or wireless mode to implement respective functions of the processing unit and the storage unit, to support the system chip in implementing various functions in the foregoing embodiments. Alternatively, the processing unit and the memory may be coupled to a same device.

It may be understood that, in the embodiments of this application, the memory may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of random access memories (RAM) may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

The terms "uplink" and "downlink" in this application are used to describe data/information transmission directions in a specific scenario. For example, an "uplink" direction is usually a direction in which data/information is transmitted from a terminal to a network side, or a direction in which data/information is transmitted from a distributed unit to a central unit, and a "downlink" direction is usually a direction in which data/information is transmitted from a network side to a terminal, or a direction in which data/information is transmitted from a central unit to a distributed unit. It may be understood that the "uplink" and the "downlink" are only used to describe transmission directions of data/information, and neither a specific device from which data/information transmission starts nor a specific device at which data/information transmission stops is limited.

Names may be assigned to various objects that may appear in this application, such as various messages/information/devices/network elements/systems/apparatuses/actions/operations/procedures/concepts. It may be understood that these specific names do not constitute a limitation on the related objects, and the assigned names may change with a factor such as a scenario, a context, or a use habit. Technical meanings of technical terms in this application should be understood and determined mainly based on functions and technical effects that are of the technical terms and that are reflected/performed in the technical solutions.

A person of ordinary skill in the art may be aware that, in combination with units and algorithm steps of the examples described in the embodiments disclosed in this application, this application can be implemented by electronic hardware or a combination of electronic hardware and computer software. Whether the functions are performed by hardware or software depends on particular applications and design constraints of the technical solutions. A person skilled in the art may use different methods to implement the described functions for each particular application, but it should not be considered that the implementation goes beyond the scope of this application.

A person skilled in the art may clearly understand that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other ways. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units may be integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for indicating a computer device (which may be a personal computer, a server, a network device, or the like) to perform all or some of the steps of the methods described in the embodiments of this application. The foregoing storage medium includes a USB flash drive, a removable hard disk, a read-only memory (ROM), and a random access memory.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method performed by a first terminal device or performed by a chip used in the first terminal device, wherein the method comprises:
   receiving sidelink scheduling information on a physical downlink control channel, wherein the sidelink scheduling information schedules the first terminal device to send sidelink data to a second terminal device;
   receiving, on a physical sidelink feedback channel from the second terminal device, hybrid automatic repeat request (HARQ) information for the sidelink data;
   determining, based on a time domain position of the physical sidelink feedback channel and a HARQ timing, a time domain position of a physical uplink control channel for sending the HARQ information;
   sending the HARQ information on the physical uplink control channel, wherein the HARQ timing is an offset value between the time domain position of the physical uplink control channel and the time domain position of the physical sidelink feedback channel; and
   when the physical uplink control channel and a first channel overlap in time domain, determining, based on a subcarrier spacing or processing capability information of the first terminal device, and based on the physical sidelink feedback channel, a time domain offset value that is between the time domain position of the physical sidelink feedback channel and a time domain position of a second channel, the second channel being a channel with an earlier time domain position in the physical uplink control channel or the first channel.

2. The method according to claim 1, wherein the HARQ timing is a quantity of slots between a slot in which a last symbol of the physical sidelink feedback channel is located and a slot in which a start symbol of the physical uplink control channel is located.

3. The method according to claim 1, wherein
   the HARQ timing is received through the physical downlink control channel.

4. The method according to claim 1, wherein
   the sidelink scheduling information is downlink control information.

5. The method according to claim 1, wherein the time domain offset value $T_3$ is determined according to following formula:

$$T_3 = (N_{SL\text{-}to\text{-}UL} + d_{SL\text{-}to\text{-}UL} + y) \times (2048 + 144) \times \kappa \times 2^{-\mu_2} \times T_C,$$

wherein y is a positive integer, $N_{SL\text{-}to\text{-}UL}$ is a quantity of symbols that is determined based on the subcarrier spacing or the processing capability information of the first terminal device, $d_{SL\text{-}to\text{-}UL}$ is a quantity of symbols that is determined based on the physical sidelink feedback channel or the processing capability information of the first terminal device, κ is a ratio of $T_s$ to $T_c$, $T_c$ is a first time unit, $T_s$ is a second time unit, and $\mu_2$ is the subcarrier spacing.

6. A method performed by a network device or performed by a chip used in a network device, wherein the method comprises:
sending sidelink scheduling information to a first terminal device on a physical downlink control channel, wherein the sidelink scheduling information schedules the first terminal device to send sidelink data to a second terminal device;
determining, based on a time domain position of a physical sidelink feedback channel and a hybrid automatic repeat request (HARQ) timing, a time domain position of a physical uplink control channel for receiving, from the first terminal HARQ information for the sidelink data;
receiving the HARQ information from the first terminal device on the physical uplink control channel,
wherein the HARQ timing is an offset value between the time domain position of the physical uplink control channel and the time domain position of the physical sidelink feedback channel, and the physical sidelink feedback channel is configured to carry the HARQ information from the second terminal device to the first terminal device; and
when the physical uplink control channel and a first channel overlap in time domain, determining, based on a subcarrier spacing or processing capability information of the first terminal device, and based on the physical sidelink feedback channel, a time domain offset value that is between the time domain position of the physical sidelink feedback channel and a time domain position of a second channel, the second channel being a channel with an earlier time domain position in the physical uplink control channel or the first channel.

7. The method according to claim 6, wherein
the sidelink scheduling information is downlink control information.

8. The method according to claim 6, wherein
the HARQ timing is sent through the physical downlink control channel.

9. A method comprising:
receiving, by a first terminal device, sidelink scheduling information on a physical downlink control channel, wherein the sidelink scheduling information schedules the first terminal device to send sidelink data to a second terminal device;
receiving, by the second terminal device, the sidelink data from the first terminal device, and sending, by the second terminal device, hybrid automatic repeat request (HARQ) information for the sidelink data to the first terminal device on a physical sidelink feedback channel;
receiving, by the first terminal device, the HARQ information;
determining, by the first terminal device based on a time domain position of the physical sidelink feedback channel and a HARQ timing, a time domain position of a physical uplink control channel for sending the HARQ information, and sending, by the first terminal device, the HARQ information in the time domain position of the physical uplink control channel, wherein the HARQ timing is an offset value between the time domain position of the physical uplink control channel and the time domain position of the physical sidelink feedback channel; and
when the physical uplink control channel and a first channel overlap in time domain, determining, by the first terminal device based on a subcarrier spacing or processing capability information of the first terminal device, and based on the physical sidelink feedback channel, a time domain offset value that is between the time domain position of the physical sidelink feedback channel and a time domain position of a second channel, the second channel being a channel with an earlier time domain position in the physical uplink control channel or the first channel.

10. The method according to claim 9, wherein the HARQ timing is a quantity of slots between a slot in which a last symbol of the physical sidelink feedback channel is located and a slot in which a start symbol of the physical uplink control channel is located.

11. The method according to claim 9, wherein
the HARQ timing is received by the first terminal device through the physical downlink control channel.

12. The method according to claim 9, wherein
the sidelink scheduling information is downlink control information.

13. The method according to claim 9, wherein the time domain offset value $T_3$ is determined according to following formula:

$$T_3 = (N_{SL\text{-}to\text{-}UL} + d_{SL\text{-}to\text{-}UL} + y) \times (2048 + 144) \times \kappa \times 2^{-\mu_2} \times T_C,$$

wherein y is a positive integer, $N_{SL\text{-}to\text{-}UL}$ is a quantity of symbols that is determined based on the subcarrier spacing or the processing capability information of the first terminal device, $d_{SL\text{-}to\text{-}UL}$ is a quantity of symbols that is determined based on the physical sidelink feedback channel or the processing capability information of the first terminal device, κ is a ratio of $T_s$ to $T_c$, $T_c$ is a first time unit, $T_s$ is a second time unit, and $\mu_2$ is the subcarrier spacing.

14. An apparatus, comprising:
at least one processor; and
one or more memories coupled to the at least one processor and storing programming instructions for execution by the at least one processor to:
receive sidelink scheduling information on a physical downlink control channel, wherein the sidelink scheduling information schedules a first terminal device to send sidelink data to a second terminal device;
receive, on a physical sidelink feedback channel from the second terminal device, hybrid automatic repeat request (HARQ) information for the sidelink data;
determine a time domain position of a physical uplink control channel for sending the HARQ information based on a time domain position of the physical sidelink feedback channel and a HARQ timing;
send the HARQ information on the physical uplink control channel, wherein the HARQ timing is an offset value between the time domain position of the physical uplink control channel and the time domain position of the physical sidelink feedback channel; and
when the physical uplink control channel and a first channel overlap in time domain, determine, based on a subcarrier spacing or processing capability information of the first terminal device, and based on the physical sidelink feedback channel, a time domain offset value that is between the time domain position of the physical sidelink feedback channel and a time domain position of a second channel, the second channel being a channel with an earlier time domain position in the physical uplink control channel or the first channel.

15. The apparatus according to claim 14, wherein the HARQ timing is a quantity of slots between a slot in which a last symbol of the physical sidelink feedback channel is located and a slot in which a start symbol of the physical uplink control channel is located.

16. The apparatus according to claim 14, wherein the one or more memories further store programming instructions for execution by the at least one processor to:
receive the HARQ timing through the physical downlink control channel.

17. The apparatus according to claim 14, wherein
the sidelink scheduling information is downlink control information.

18. The apparatus according to claim 14, wherein the time domain offset value $T_3$ is determined according to following formula:

$$T_3 = (N_{SL\text{-}to\text{-}UL} + d_{SL\text{-}to\text{-}UL} + y) \times (2048 + 144) \times \kappa \times 2^{-\mu_2} \times T_C,$$

wherein y is a positive integer, $N_{SL\text{-}to\text{-}UL}$ is a quantity of symbols that is determined based on the subcarrier spacing or the processing capability information of the first terminal device, $d_{SL\text{-}to\text{-}UL}$ is a quantity of symbols that is determined based on the physical sidelink feedback channel or the processing capability information of the first terminal device, $\kappa$ is a ratio of $T_s$ to $T_c$, $T_c$ is a first time unit, $T_s$ is a second time unit, and $\mu_2$ is the subcarrier spacing.

19. An apparatus, comprising:
at least one processor; and
one or more memories coupled to the at least one processor and storing programming instructions for execution by the at least one processor to:
send sidelink scheduling information to a first terminal device on a physical downlink control channel, wherein the sidelink scheduling information schedules the first terminal device to send sidelink data to a second terminal device;
determine, based on a time domain position of a physical sidelink feedback channel and a hybrid automatic repeat request (HARQ) timing, a time domain position of a physical uplink control channel for receiving, from the first terminal device, HARQ information for the sidelink data; and
receive the HARQ information from the first terminal device on the physical uplink control channel, wherein the HARQ timing is an offset value between the time domain position of the physical uplink control channel and the time domain position of the physical sidelink feedback channel, and the physical sidelink feedback channel is configured to carry the HARQ information from the second terminal device to the first terminal device; and
when the physical uplink control channel and a first channel overlap in time domain, determine, based on a subcarrier spacing or processing capability information of the first terminal device, and based on the physical sidelink feedback channel, a time domain offset value that is between the time domain position of the physical sidelink feedback channel and a time domain position of a second channel, the second channel being a channel with an earlier time domain position in the physical uplink control channel or the first channel.

20. The apparatus according to claim 19, wherein the sidelink scheduling information is downlink control information.

21. The apparatus according to claim 19, wherein
the HARQ timing is sent through the physical downlink control channel.

22. A non-transitory computer-readable storage medium comprising instructions which, when executed by a computer, cause the computer to:
receive sidelink scheduling information on a physical downlink control channel, wherein the sidelink scheduling information schedules a first terminal device to send sidelink data to a second terminal device;
receive, on a physical sidelink feedback channel from the second terminal device, hybrid automatic repeat request (HARQ) information for the sidelink data;
determine, based on a time domain position of the physical sidelink feedback channel and a HARQ timing, a time domain position of a physical uplink control channel for sending the HARQ information;
send the HARQ information on the physical uplink control channel, wherein the HARQ timing is an offset value between the time domain position of the physical uplink control channel and the time domain position of the physical sidelink feedback channel; and
when the physical uplink control channel and a first channel overlap in time domain, determine, based on a subcarrier spacing or processing capability information of the first terminal device, and based on the physical sidelink feedback channel, a time domain offset value that is between the time domain position of the physical sidelink feedback channel and a time domain position of a second channel, the second channel being a channel with an earlier time domain position in the physical uplink control channel or the first channel.

23. The non-transitory computer-readable storage medium according to claim 22, wherein the HARQ timing is a quantity of slots between a slot in which a last symbol of the physical sidelink feedback channel is located and a slot in which a start symbol of the physical uplink control channel is located.

24. The non-transitory computer-readable storage medium according to claim 22, wherein
the HARQ timing is received through the physical downlink control channel.

25. The non-transitory computer-readable storage medium according to claim 22, wherein
the sidelink scheduling information is downlink control information.

26. The non-transitory computer-readable storage medium according to claim 22, wherein the time domain offset value $T_3$ is determined according to following formula:

$$T_3 = (N_{SL\text{-}to\text{-}UL} + d_{SL\text{-}to\text{-}UL} + y) \times (2048 + 144) \times \kappa \times 2^{-\mu_2} \times T_C,$$

wherein y is a positive integer, $N_{SL\text{-}to\text{-}UL}$ is a quantity of symbols that is determined based on the subcarrier spacing or the processing capability information of the first terminal device, $d_{SL\text{-}to\text{-}UL}$ is a quantity of symbols that is determined based on the physical sidelink feedback channel or the processing capability information of the first terminal device, $\kappa$ is a ratio of $T_s$ to $T_c$, $T_c$ is a first time unit, $T_s$ is a second time unit, and $\mu_2$ is the subcarrier spacing.

27. A non-transitory computer-readable storage medium comprising instructions which, when executed by a computer, cause the computer to:

send sidelink scheduling information to a first terminal device on a physical downlink control channel, wherein the sidelink scheduling information schedules the first terminal device to send sidelink data to a second terminal device;

determine, based on a time domain position of a physical sidelink feedback channel and a HARQ timing, a time domain position of a physical uplink control channel for receiving, from the first terminal device, hybrid automatic repeat request (HARQ) information for the sidelink data;

receive the HARQ information from the first terminal device on the physical uplink control channel, wherein the HARQ timing is an offset value between the time domain position of the physical uplink control channel and the time domain position of the physical sidelink feedback channel, and the physical sidelink feedback channel is configured to carry the HARQ information from the second terminal device to the first terminal device; and when the physical uplink control channel and a first channel overlap in time domain, determine, based on a subcarrier spacing or processing capability information of the first terminal device and the physical sidelink feedback channel, a time domain offset value that is between the time domain position of the physical sidelink feedback channel and a time domain position of a second channel, the second channel being a channel with an earlier time domain position in the physical uplink control channel or the first channel.

28. The non-transitory computer-readable storage medium according to claim 27, wherein
the sidelink scheduling information is downlink control information.

29. The non-transitory computer-readable storage medium according to claim 27, wherein
the HARQ timing is sent through the physical downlink control channel.

* * * * *